US010044752B1

(12) United States Patent
Wittenstein

(10) Patent No.: US 10,044,752 B1
(45) Date of Patent: Aug. 7, 2018

(54) NULL-BYTE INJECTION DETECTION

(71) Applicant: EMC Corporation, Hopkinton, MA (US)

(72) Inventor: Andreas Wittenstein, Granada (ES)

(73) Assignee: EMC IP Holding Company LLC, Hopkinton, MA (US)

( * ) Notice: Subject to any disclaimer, the term of this patent is extended or adjusted under 35 U.S.C. 154(b) by 269 days.

(21) Appl. No.: 14/870,537

(22) Filed: Sep. 30, 2015

(51) Int. Cl.
*G06F 11/00* (2006.01)
*H04L 29/06* (2006.01)
*G06F 17/30* (2006.01)

(52) U.S. Cl.
CPC .... *H04L 63/1466* (2013.01); *G06F 17/30958* (2013.01); *H04L 63/1408* (2013.01)

(58) Field of Classification Search
CPC ............. G06F 21/566; G06F 17/30958; H04L 63/1466; H04L 63/1408
USPC ........................................................ 726/4, 23
See application file for complete search history.

(56) References Cited

U.S. PATENT DOCUMENTS

2003/0188117 A1* 10/2003 Yoshino .............. G06F 21/6218 711/164

OTHER PUBLICATIONS

Berstel, et al.; "Minimization of Automata"; Universite Paris-Est marne-la-Valee; Jan. 4, 2011; 3h39; pp. 1-37.
Rabin, et al.; "Finite Automata and Their Decision Problems"; IBM Journal; Apr. 1959; pp. 114-125.

* cited by examiner

*Primary Examiner* — Kambiz Zand
*Assistant Examiner* — Aubrey Wyszynski
(74) *Attorney, Agent, or Firm* — BainwoodHuang

(57) ABSTRACT

A single system for detecting and blocking all cases of null-byte injection in all text data received for a network, before the text reaches potentially vulnerable services in the network. A set of directed graphs is received, each one of the directed graphs corresponding to a singly encoded null-byte that is encoded according to a corresponding character encoding method contained within a set of character encoding methods. The set of directed graphs is used to generate an output finite-state machine that models detection of at least one multiply encoded null-byte that is encoded according to at least one of the character encoding methods contained in the set of character encoding methods. The output finite-state machine is loaded into an attack detection and prevention system that receives input text, and that detects null-bytes, including multiply encoded null-bytes, within the input text.

22 Claims, 27 Drawing Sheets

1300

1400

NULL-BYTE INJECTION DETECTION

BACKGROUND

As it is generally known in the area of computer security, null-byte injection is a type of computer network attack in which a text string supplied by a client contains an embedded character interpretable as having a physical value of zero. Such a text string can be provided, for example, in the URI (Uniform Resource Identifier) of an HTTP (HyperText Transfer Protocol) GET request, in an HTTP header, in the message body of an HTTP POST request, or in a JSON (JavaScript Object Notation) or XML (eXtensible Markup Language) file.

The injected null byte can either be a literal, un-encoded null-byte (a "naked" null-byte), or it can be obfuscated by encoding it in numerous different ways, using one or more standard character encoding methods, such as C backslash-escape sequence encoding, URL (Uniform Resource Locator) percent encoding, and/or XML numeric character reference encoding. C backslash-escape sequences are used in C and C++, and also in many C-like interpreted languages, such as Java, C#, Perl, and Ruby, as well as Adobe PostScript and Microsoft Rich Text Format. URL encoding is used in HTTP requests, including the URI, and in the message body (provided that the message's Content-Type header includes the string "application/x-www-form-urlencoded"). XML numeric character references are used in XML as well as in HTML (HyperText Markup Language), MathML (Mathematical Markup Language), and SGML (Standard Generalized Markup Language).

Problems arise when a null-byte is interpreted as an end-of-string sentinel in some phases of processing but not in others. Null-byte injection is often used by attackers to bypass sanity checks, which can result in service outages or lead to various business-logic exploits. For example, if a portion of a string before the first null-byte is a valid value for the variable being specified, an input validator interpreting the string as null-terminated will let it pass, ignoring any potentially malignant payload following that null-byte. If the space allocated for the string is determined by the apparent sentinel position of the null-byte, storing the entire string will cause a buffer overflow. If the null-byte is ignored when the string is evaluated, the text may yield an out-of-range value. And if the payload is interpreted or executed in a later processing phase, it can be used for a code-injection attack.

Improperly validated out-of-range values can cause service outages or yield business-logic exploits in a variety of specific ways. For example, an out-of-range value may cause a program to crash or otherwise behave unexpectedly. A negative monetary value may result in money being credited to an account instead of debited from it. A zero quantitative value may cause a program to crash from an attempted division by or logarithm of zero, or wreak havoc with an uncaught infinity or NaN (Not a Number).

Buffer overflows can also cause a variety of specific service outages or business-logic exploits. In the simplest case, a buffer overflow may cause a server application to crash. If the buffer is on the program stack, it may corrupt the stack, causing wildly unexpected behavior.

At worst, in the case of a code-injection attack on a von Neumann-architecture machine, the data beyond the null-byte may be interpreted as code, giving the attacker control over the application.

By employing different permutations (including repetitions) of a set of character encoding methods to disguise embedded null-bytes, an attacker can potentially smuggle a malicious text through various processing phases to attack targets deep inside a network. In particular, in an advanced-persistent-threat scenario in which an attacker has acquired sufficient intelligence to simulate the target network's operation in detail, a strategically encoded null-byte in a text string, introduced through a well-chosen vulnerable point of entry, could potentially guide an appropriately designed payload to any desired point in the network in order to hijack or otherwise affect any desired service at any desired time.

SUMMARY

Previous approaches that have attempted to detect injected null-bytes have exhibited significant shortcomings. Networked servers and websites generally host many different services programmed and maintained by many different individuals on many different teams, and accordingly there have been myriad independent entry points and targets for null-byte injection attacks. Getting all programmers that are involved in securing all such entry points and targets to ensure that every single input processed by their software is properly validated, in order to protect against all possible null-byte injection attacks, and to ensure that entry points and targets remain protected in this way through every software revision, would be a Sisyphean task.

In some previous approaches, some networks have gauged their vulnerability to null-byte injection attacks by employing general penetration-testing services that include tests to determine whether any of the network's services fail when probed with text strings containing embedded null-bytes that are either literal naked null-bytes, or that are obfuscated with only a small number of simple encodings. These previous approaches, however, can only test a few of the possible null-byte encodings, and generally only test a fraction of the ever-changing set of possible text-string variables accepted by the network's services.

To address these and other shortcomings of previous solutions, new techniques are disclosed herein for making a network rigorously resistant to null-byte injection attacks, by interposing a single system for detecting and blocking all cases of null-byte injection in all received text data, before the text reaches any potentially vulnerable services in the network. In the disclosed system, a set of directed graphs is received, where each one of the directed graphs in the set corresponds to a singly encoded null-byte that is encoded according to a corresponding character encoding method contained within a set of character encoding methods. The disclosed system uses the set of directed graphs to generate an output finite-state machine that models detection of at least one multiply encoded null-byte that is encoded multiple times using one or more of the character encoding methods contained in the set of character encoding methods. The disclosed system then loads the output finite-state machine into an attack detection and prevention system. The attack detection and prevention system receives at least one input text, and detects at least one instance of the multiply encoded null-byte within the input text, in response to the output finite-state machine loaded in the attack detection and prevention system.

In a first embodiment of the disclosed system, each one of the directed graphs in the set of directed graphs is an input finite-state machine that models detection of a singly encoded null-byte that is encoded according to the corresponding one of the encoding methods in the set of encoding methods.

In another aspect of the first embodiment, the output finite-state machine is generated at least in part by generating composite finite-state machines by convolving the input finite-state machines, by applying at least one of the encoding methods in the set of encoding methods to each transition input-byte character in the input finite-state machine.

In another aspect of the first embodiment, the output finite-state machine is generated at least in part by summing the composite finite-state machines to generate a non-deterministic finite-state machine.

In another aspect of the first embodiment, the output finite-state machine is generated at least in part by converting the non-deterministic finite-state machine to a deterministic finite-state machine.

In another aspect of the first embodiment, the output finite-state machine is generated at least in part by minimizing the deterministic finite-state machine to generate a minimal deterministic finite-state machine.

In another aspect of the first embodiment, loading the output finite-state machine into the attack detection and prevention system includes generating an output state-transition table representing the output finite-state machine and loading the output state-transition table into the attack detection and prevention system, and detecting the instance of the multiply encoded null-byte within the input text by the attack detection and prevention system is in response to the output state-transition table loaded into the attack detection and prevention system. Alternatively, the entire output finite-state machine (not just the transition table) may be converted to microcode instructions and loaded into firmware in the attack detection and prevention system. As another alternative, the entire output finite-state machine may be implemented directly in hardware comprising a processing unit which is loaded into the attack detection and prevention system.

In another aspect of the first embodiment, the attack detection and prevention system generates, in response to the output state-transition machine and the input text, a clean subset of the input text that contains no null-bytes, and passes the clean subset of the input text from the attack detection and prevention system to at least one service that is external to the attack detection and prevention system.

In another aspect of the first embodiment, the disclosed system generates an inverted finite-state machine is by inverting the output finite-state machine. A plurality of multiply encoded, test null-byte encodings are then generated by randomly traversing the inverted output finite-state machine. The test null-byte encodings are then used to generate at least one test input text by storing the plurality of test null-byte encodings into the test input text.

In an alternative embodiment, each one of the directed graphs in the set of directed graphs is an input finite-state machine that models decoding a singly encoded null-byte that is encoded according to the corresponding one of the encoding methods in the set of encoding methods.

In another aspect of the alternative embodiment, the output finite-state machine is generated by combining the input finite-state machines into a total finite-state machine containing copies of the input finite-state machines arranged to represent all permutations of the encoding methods (including a chosen maximum number of repetitions, e.g. 3) in the set of encoding methods.

Embodiments based on the disclosed techniques provide significant advantages over previous technologies. For example, by detecting embedded null-bytes that are encoded using different permutations of a set of character encoding methods, the disclosed system can prevent an attacker from potentially smuggling a malicious text through various processing phases to attack targets deep inside a private network. The disclosed system may advantageously detect and block text strings containing strategically encoded null-bytes that could otherwise guide a malicious payload to a point or points in a network that allow an attacker to hijack a vulnerable service. By interposing a single system for detecting and blocking all cases of null-byte injection in all received text data for a network, before the text can reach any potentially vulnerable services in the network, the disclosed techniques advantageously provide a single point at which protection against null-byte injection attacks is conveniently and effectively provided for potentially large numbers of independent entry points and targets.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided only by way of example to illustrate various features and principles of the invention, and that the invention itself is broader than the specific examples of embodiments disclosed herein.

An improved technique for making a network rigorously resistant to null-byte injection attacks interposes a single system for detecting and blocking all cases of null-byte injection in all received text data, before the text reaches any potentially vulnerable services in the network. A set of directed graphs is received, and each one of the directed graphs in the set corresponds to a singly encoded null-byte that is encoded according to a corresponding character encoding method contained within a set of character encoding methods. The set of directed graphs is used to generate an output finite-state machine that models detection of at least one multiply encoded null-byte that is multiply encoded according to one or more of the character encoding methods contained in the set of character encoding methods. The output finite-state machine is loaded into an attack detection and prevention system. The attack detection and prevention system receives at least one input text, and operates in response to the output finite-state machine to detect at least one instance of the multiply encoded null-byte within the input text.

Each of the directed graphs in the set of directed graphs may be an input finite-state machine that models detection of a singly encoded null-byte encoded according to the corresponding one of the encoding methods in the set of encoding methods, and the output finite-state machine may be generated in part by generating composite finite-state machines by convolving each of the input finite-state machines, by applying at least one of the encoding methods in the set of encoding methods to each of the transition characters in the input finite-state machine.

Figure 1:
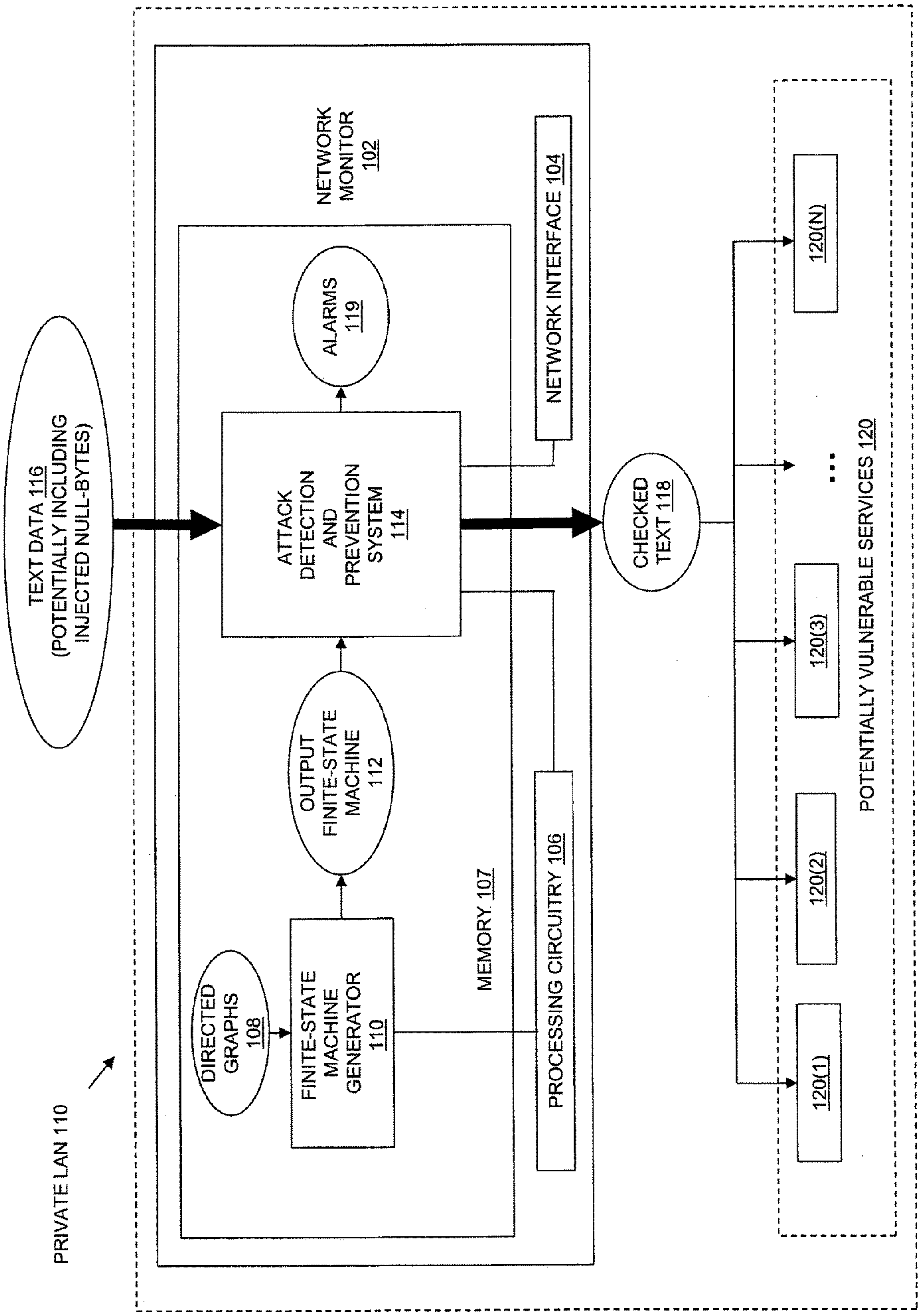
FIG. 1 is a block diagram showing an operational example of an illustrative embodiment of the disclosed system, checking text data received from an external source prior to the text data being passed to one or more potentially vulnerable services within a private network.

FIG. 1 is a block diagram showing an illustrative embodiment of the disclosed system contained in a Network Monitor 102, and checking Text Data 116 for injected null-bytes prior to the Text Data 116 being passed to one or more Potentially Vulnerable Services 120 in a Private LAN (Local Area Network) 110. While in the example of FIG. 1, the Text Data 116 that is being checked is received from outside of a Private LAN 110, and is destined for a set of Potentially Vulnerable Services 120 located within the Private LAN 110, this specific example of operation is only provided for purposes of explanation and illustration, and the disclosed system is not limited to use in the checking shown in and discussed with reference to FIG. 1. Network Monitor 102 may alternatively, or in addition, operate to check text data being passed from one or more internal sources located within Private LAN 110 to one or more of the Potentially Vulnerable Services 120, and/or to check text data being passed from a source within Private LAN 110 to one or more potentially vulnerable services located outside of Private LAN 110.

In the illustrative example of FIG. 1, Private LAN (Local Area Network) 110 includes a Network Monitor 102 and Potentially Vulnerable Services 120, shown as services 120(1) through 120(N). Private LAN 100 may belong to and/or be under the control of an entity such as a business, governmental agency, and/or private individual, and access to and/or use of Potentially Vulnerable Services 120 is restricted to individuals, devices and/or programs that are granted access and appropriate authorizations by that entity. Each of Potentially Vulnerable Services 120 may, for example, be hosted by one or more server computers located within Private LAN 110. During its operation, each of Potentially Vulnerable Services 120 may receive as an input some amount of text data from within Text Data 116. The Potentially Vulnerable Services 120 may include any specific type of service or application, including but not limited to Web sites, application programs, etc.

Network Monitor 102 includes Processing Circuitry 106, Network Interface 104, and Memory 107. Network Interface 104 may, for example, include or consist of one or more network interface cards (NICs) or the like, through which Network Monitor 102 is communicably connected to Private LAN 110. Processing Circuitry 106 may, for example, include or consist of one or more microprocessors or the like. Memory 107 may, for example, include or consist of any specific type of volatile or non-volatile semiconductor memory or other program storage that is operable to store programs (sequences of instructions) and/or data (e.g. input data, program state information, etc.) for use during operation of the Network Monitor 102. For example, executable instructions in Memory 107 may include a Finite-State Machine Generator 110, and Attack Detection and Prevention System 114. When executable instructions of Finite-State Machine Generator 110 and/or Attack Detection and Prevention System 114 are executed by Processing Circuitry 106, one or more processing units in Processing Circuitry 106 carry out the operations of these software constructs. Those skilled in the art will recognize that while certain software constructs are shown in FIG. 1 for purposes of illustration and described herein for purposes of explanation, the Memory 107 may additionally or alternatively include other software constructs, which are not shown, such as an operating system, various applications, and/or other processes.

During operation of the illustrative embodiment of FIG. 1, Finite-State Machine Generator 110 receives a set of directed graphs, shown in FIG. 1 as Directed Graphs 108. Each one of the directed graphs in the set of directed graphs shown by Directed Graphs 108 in FIG. 1 corresponds to a singly encoded null-byte that is encoded according to a corresponding one of a set of character encoding methods. The set of character encoding methods may include any encoding method, including standard encoding methods. In one example, the set of character encoding methods includes character encoding methods related to C backslash-escape sequence encoding, URL (Uniform Resource Locator) percent encoding, and XML numeric character reference encoding, as described briefly for purposes of explanation below.

There are several distinct variants of C backslash-escape sequence encoding: octal, and hexadecimal, as well as UTF-16, and UTF-32. In octal C backslash-escape sequence encoding, any octet can be represented by a backslash (<\>) character, followed by the octet's value expressed as one to three octal-digit characters, including optional leading zeros. Accordingly, a null-byte can be singly encoded using octal C backslash-escape sequence encoding as <\><0> (followed by a non-octal character), as <\><0><0> (followed by a non-octal character), or as <\><0><0><0>.

In another example, in hexadecimal C backslash-escape encoding, any octet can be represented by a backslash (<\>) character, followed by a lower-case letter ex (<x>), followed by the octet's value sequentially expressed as at least one hexadecimal-digit character.

Accordingly, a null-byte can be singly encoded using hexadecimal C backslash-escape encoding as <\><x><0> (followed by a non-hexadecimal character), or as <\><x><0><0>.

UTF-16 and UTF-32 are C backslash-escape sequences that denote Unicode code points in string literals. UTF-16 encoding has the form backslash (<\>), followed by lower-case "u" (<u>), followed by four digits denoting a Unicode entity (code point). Accordingly, a null-byte can be singly encoded using UTF-16 as <\><u><0><0><0><0>. UTF-32 encoding has the form backslash (<\>), followed by upper-case "U" (<U>), followed by eight digits denoting a Unicode code point. Accordingly, a null-byte can be singly encoded using UTF-32 as <\><U><0><0><0><0><0><0><0><0>.

In URL encoding, any octet can be represented by a percent (<%>) character followed by the octet's value expressed as two hexadecimal digits. Accordingly, a null-byte can be singly encoded using URL encoding as <%><0><0>.

There are two types of XML encoding that are relevant to null-bytes: decimal and hexadecimal numeric character references, referred to herein as decimal XML encoding and hexadecimal XML encoding respectively. In decimal XML encoding, any Unicode entity can be represented by an ampersand (<&>) character, followed by a pound (<#>) character, followed by any number of leading zero (<0>) characters, followed by the entity's value expressed as one or more decimal digits, followed by a semicolon (<;>) character. Accordingly, a null-byte can be singly encoded using decimal XML encoding as <&><#><0><;>, where the <0> could be repeated any number of times. In base-sixteen XML encoding, any Unicode entity can be represented by an ampersand (<&>) character, followed by a pound (<#>) character, followed by a lower-case letter ex (<x>), followed by any number of leading zero (<0>) characters, followed by the entity's value expressed as one or more hexadecimal digits, followed by a semicolon (<;>) character. Accordingly, a null-byte can be singly encoded using base-sixteen XML encoding as <&><#><x><0><;>, where, again, the <0> could be repeated any number of times.

Based on the above, in one embodiment, the set of character encoding methods may accordingly include i) octal C backslash-escape sequence encoding, ii) hexadecimal C backslash-escape sequence encoding, iii) UTF-16 C backslash-escape sequence encoding (UTF-16), iv) UTF-32 C backslash-escape sequence encoding (UTF-32), v) URL encoding, vi) decimal XML encoding, and vii) hexadecimal XML encoding. Accordingly, in such an embodiment, the set of directed graphs, shown in FIG. 1 as Directed Graphs 108, includes a directed graph corresponding to a singly encoded null-byte that is encoded according to each of these seven character encoding methods. Specifically, Directed Graphs 108 includes i) a directed graph corresponding to a singly encoded null-byte encoded according to octal C backslash-escape sequence encoding, ii) a directed graph corresponding to a singly encoded null-byte encoded according to hexadecimal C backslash-escape sequence encoding, iii) a directed graph corresponding to a singly encoded null-byte encoded according to UTF-16 C backslash-escape sequence encoding (UTF-16), iv) a directed graph corresponding to a singly encoded null-byte encoded according to UTF-32 C backslash-escape sequence encoding (UTF-32), v) a directed graph corresponding to a singly encoded null-byte encoded according to URL encoding, vi) a directed graph corresponding to a singly encoded null-byte encoded according to decimal XML encoding, and vii) a directed graph corresponding to a singly encoded null-byte encoded according to hexadecimal XML encoding.

Further during operation of the illustrative embodiment shown in FIG. 1, Finite-State Machine Generator 110 generates Output Finite-State Machine 112 using Directed Graphs 108. Finite-State Machine Generator 110 generates Output Finite-State Machine 112 such that Output Finite-State Machine 112 models computation for detecting at least one multiply encoded null-byte. The multiply encoded null-byte that Output Finite-State Machine 112 models computation for detecting is multiply encoded according to one or more of the character encoding methods contained in the set of character encoding methods, e.g. multiply encoded according to one or more of the set of character encoding methods consisting of i) octal C backslash-escape sequence encoding, ii) hexadecimal C backslash-escape sequence encoding, iii) UTF-16 C backslash-escape sequence encoding (UTF-16), iv) UTF-32 C backslash-escape sequence encoding (UTF-32), v) URL encoding, vi) decimal XML encoding, and vii) hexadecimal XML encoding.

In one example, the multiply encoded null-byte may consist of a null-byte encoded by both the decimal XML character encoding and URL character encoding methods. In other words, the multiply encoded null-byte may consist of a null-byte first encoded using the decimal XML character encoding method, to obtain an initial encoding of <&><#><0><;>, and encoded again by encoding one or more of the characters in the initial decimal XML null-byte encoding using the URL encoding method. Some examples of such a multiply encoded null-byte are provided below. In the following example, a multiply encoded null-byte encoded by both the decimal XML character encoding method and the URL character encoding method is shown in the bolded portion of the text string, in which the semi-colon character (<;>) of the initial decimal XML null-byte encoding (<&><#><0><;>) has been URL encoded as the URL encoding of a semi-colon (<%><3><B>):

000�%3B000

In another example of a multiply encoded null-byte encoded by both the decimal XML character encoding method and the URL character encoding method is shown in the bolded portion of the following text string, in which the semi-colon character (<;>) of the initial decimal XML null-byte encoding (<&><#><0><;>) has been URL encoded as the alternative URL encoding of semi-colon (<%><3><b>—with lower-case <b>):

000�%3b000

While the above examples of multiply encoded null-bytes show cases in which a single character in the initial decimal XML null-byte encoding has been encoded using a different character encoding (e.g. URL encoding), multiple characters of the initial encoding may be encoded according to the another, different character encoding. For example, in the below case, in addition to the semi-colon character (<;>), the zero character (<0>) in the initial decimal XML null-byte encoding <&><#><0><;> has also been URL encoded as the URL encoding of the zero character <%><3><0>:

000&#%30%3b000

Accordingly, any or all of the characters in a multiply encoded null-byte may consist of characters resulting from encoding the characters of an initial encoding of the null-byte according to a different character encoding method than was used to generate the initial encoding.

Similarly, any or all of the characters in a multiply encoded null-byte may consist of characters resulting from encoding the characters of an initial encoding of the null-byte according to the same character encoding method that was used to generate the initial encoding. And it will further be apparent that a multiply encoded null-byte is not limited to a null-byte that in part or in whole has been encoded only twice, and that additional encodings to any part (i.e. character) of the multiply encoded null-byte may consist of further encodings according to any one or more of the character encoding methods in the set of character encoding methods. Accordingly, the multiply encoded null-byte that Output Finite-State Machine 112 models computation for detecting may be encoded various specific numbers of times, according to any one or more of the character encoding methods contained in the set of character encoding methods.

Finite-State Machine Generator 110 also loads Output Finite-State Machine 112 into the Attack Detection and Prevention System 114. In one embodiment, Finite-State Machine Generator 110 generates a state-transition table representing Output Finite-State Machine 112, and loads the state-transition table representing Output Finite-State Machine 112 into the Attack Detection and Prevention System 114 shown in FIG. 1.

The Attack Detection and Prevention System 114 then operates to receive at least one input text, shown for purposes of illustration in FIG. 1 by Text Data 116, and uses the Output Finite-State Machine 112 to detect any injected null-bytes, such as an instance of a multiply encoded null-byte, within the Text Data 116. For example, Attack Detection and Prevention System 114 may operate in response to the state-transition table representing Output Finite-State Machine 112 in order to detect any injected null-bytes within the Text Data 116, such as an instance of a multiply encoded null-byte that is multiply encoded according to one or more of the character encoding methods in the set of character encoding methods, an instance of a singly encoded null-byte that is singly encoded according to one of the character encoding methods in the set of character encoding methods, and/or an un-encoded "naked" null-byte.

In response to detecting any injected null-bytes in Text Data 116, including one or more un-encoded, singly encoded and/or multiply encoded null-bytes, Attack Detection and Prevention System 114 may issue one or more Alarms 119. Any specific type of alarm may be used in Alarms 119. For example, a notification may be generated as a message (e.g. electronic mail, text message, etc.) sent to a system administrator user indicating the source of the portion of Text Data 116 that included the detected injected null-byte, and indicating the specific one of the Potentially Vulnerable Services 120 to which the text that included the injected null-byte was directed.

Any portion of Text Data 116 in which any injected null-byte has been detected may be blocked by Attack Detection and Prevention System 114 from being delivered to Potentially Vulnerable Services 120. Accordingly, Checked Text 118 that is passed from Attack Detection and Prevention System 114 includes only the text data from within Text Data 116 that includes no injected null-bytes, and that accordingly is free of injected null-bytes that are un-encoded, singly encoded and/or multiply encoded.

The Finite-State Machine Generator 110 may also generate an inverted output finite-state machine is by inverting the Output Finite-State Machine 112. The Finite-State Machine Generator 110 may then generate a number of multiply encoded, test null-byte encodings by randomly traversing the inverted output finite-state machine. For example, the random traversal may include randomly transitioning from state to state of the Output Finite-State Machine 112, outputting one byte per transition. One or more test input texts may then be generated using the test null-byte encodings generated by the Finite-State Machine Generator 110, by storing the text null-byte encodings into the test input strings. Such test input strings may then be advantageously used to perform rigorous null-byte penetration testing of one or more systems that provide attack detection and prevention.

Figure 2:
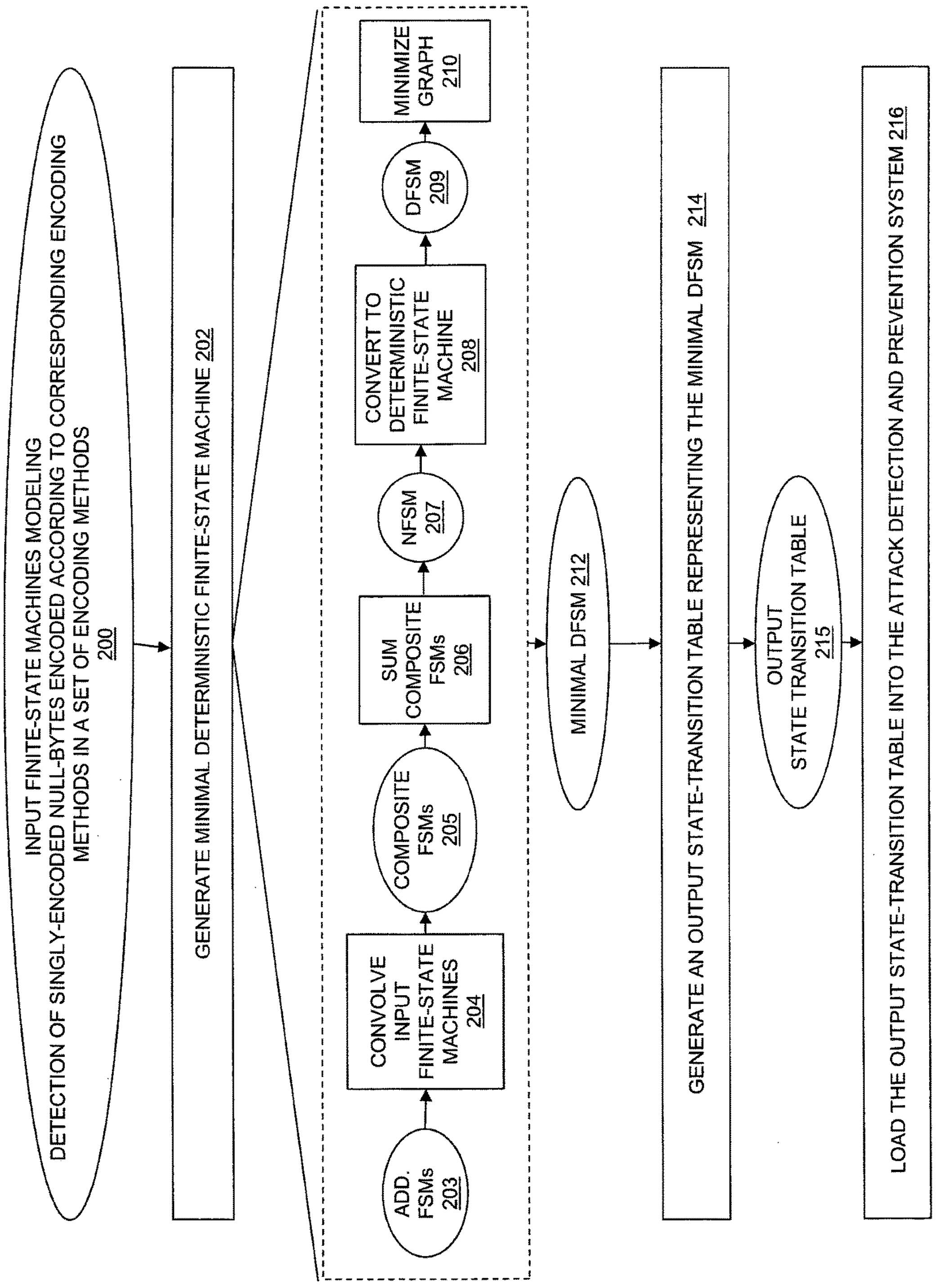
FIG. 2 is a flow chart illustrating steps performed during operation of a first embodiment of the disclosed system, to generate an output minimal deterministic finite-state machine based on input finite-state machines modeling detection of singly encoded null-bytes encoded according to corresponding encoding methods in a set of encoding methods, the output deterministic finite-state machine to be loaded into and used by the attack detection and prevention system to detect un-encoded, singly encoded, and multiply encoded null-bytes.

FIG. 2 is a flow chart illustrating steps performed during operation of a preferred embodiment of the disclosed system. The steps of FIG. 2 may be performed by the Finite-State Machine Generator 110 shown in FIG. 1. As shown in FIG. 2, in the preferred embodiment, the Directed Graphs 108 are embodied as Input Finite-State Machines 200. Each of Input Finite-State Machines 200 is a finite-state machine that models computation for detecting a singly encoded null-byte that is encoded according to a corresponding one of the encoding methods in the set of encoding methods. In the preferred embodiment of the disclosed system, at step 202 of FIG. 2, the Input Finite-State Machines 200 are used to generate an Output Finite-State Machine 112 (FIG. 1) that is a minimal DFSM (Deterministic Finite-State Machine), as shown in FIG. 2 by Minimal DFSM 212. The generation of the Minimal DFSM 212 performed at step 202 by Finite-State Machine Generator 110 may include the sub-steps 204, 206, 208, and 210.

In sub-step 204, each one of the Input Finite-State Machines 200 are convolved by applying at least one of the encoding methods in the set of encoding methods to each one of a number of transition characters in the input finite-state machine. The convolution of sub-step 204 may include applying an encoding method other than the encoding method corresponding to the input finite-state machine to each transition character in the input finite-state machine, and/or applying the encoding method corresponding to the input finite-state machine to each transition character in the input finite-state machine. A number of additional finite-state machines, shown as Additional FSMs 203, may also be received by the Finite-State Machine Generator 110 to be used as an additional input to the sub-step 204. The Additional FSMs 203 may include finite-state machines that model detection of those individual character encodings, in each one of the character encoding methods in the set, that are needed to multiply-encode null-bytes singly encoded by each of the other character encoding methods in the set. For example, the Additional FSMs 203 would include i) finite-state machines modeling the octal C backslash-escape sequence character encodings needed to multiply-encode null-bytes singly encoded using any of the other character encodings in the set of character encodings, ii) finite-state machines modeling the hexadecimal C backslash-escape sequence character encodings needed to multiply-encode null-bytes encoded using any of the other character encodings in the set of character encodings, iii) finite-state machines modeling the UTF-16 encodings needed to multiply-encode null-bytes encoded using any of the other character encodings in the set of character encodings, and so on for each of the character encoding methods in the set.

The result of sub-step 204 is a number of composite finite-state machines, shown in FIG. 2 by Composite FSMs 205. The Composite FSMs 205 are then used in sub-step 206, in which the Composite FSMs 205 are summed to generate a non-deterministic finite-state machine (NFSM), shown in FIG. 2 by NFSM 207. The summing performed at sub-step 206 may be performed using conventional techniques for summing finite-state machines. For example, in one embodiment, generating each of the Composite FSMs 205 may include generating a state transition table for the individual one of the Composite FSMs 205, and the summing performed in sub-step 206 may be performed by adjoining the state transition tables for each of the Composite FSMs 205 into a single state transition table representing NFSM 207.

NFSM 207 is then used in sub-step 208, in which NFSM 207 is converted to a deterministic finite-state machine (DFSM), shown in FIG. 2 as DFSM 209. The conversion of NFSM 207 to DFSM 209 in sub-step 208 may, for example, be performed using standard techniques, such as the standard "powerset construction" (aka "subset construction") method for converting a non-deterministic finite automaton (NFA) into a deterministic finite automaton (DFA), and/or any other specific conversion technique that may be appropriate for a specific implementation. Sub-step 208 is optional but preferred, because (i) a DFA is quicker to execute than a corresponding NFA, because for any given input, only a single path needs to be followed; (ii) a DFA is simpler to execute than a corresponding NFA, because at any stage, only a single current state needs to be retained.

At sub-step 210, DFSM 209 is minimized to generate Minimal DFSM 212. DFSM 212 is an example of the Output Finite-State Machine 112 shown in FIG. 1 as generated in the preferred embodiment of FIG. 2. The minimization performed at sub-step 210 may, for example, be performed using any specific DFA minimization technique, as are known in the area of automata theory, for transforming a given deterministic finite automaton (DFA) into an equivalent DFA that has a minimum number of states. Sub-step 210 is optional but preferred, because a minimal DFA occupies less memory or less circuitry than a corresponding non-minimal DFA.

At step 214, the disclosed system generates a state-transition table representing the Minimal DFSM 212, shown in FIG. 2 by Output State-Transition Table 215. As is conventional and known, any finite-state machine may be represented as a state-transition table, where the state-transition table is a table representing each next state (or states in the case of a nondeterministic finite-state machine) that the finite-state machine will proceed to, from each possible current state in the finite-state machine, based on one or more inputs. Accordingly, a state-transition table may be generated from the Minimal DFSM 212 using conventional techniques. Alternatively, where the Minimal DFSM 212 itself is generated as a state-transition table, then no generation is required, and Output State-Transition Table 215 is the same as Minimal DFSM 212.

In an alternative embodiment, the entire Minimal DFSM 212 (not just the Output State-Transition Table 215) may be converted to microcode instructions and loaded into firmware in the attack detection and prevention system. In another alternative, the entire Minimal DFSM 212 may be implemented directly in hardware comprising a processing unit which is loaded into the attack detection and prevention system.

At step 216, the disclosed system loads Output State-Transition Table 215 into the Attack Detection and Prevention System 114 shown in FIG. 1, which then operates based on Output State-Transition Table 215 to detect un-encoded null-bytes, null-bytes singly encoded by one of the character encoding methods in the set, and null-bytes that are multiply encoded by one or more of the character encoding methods in the set, that are contained in the Text Data 116.

Figure 3:
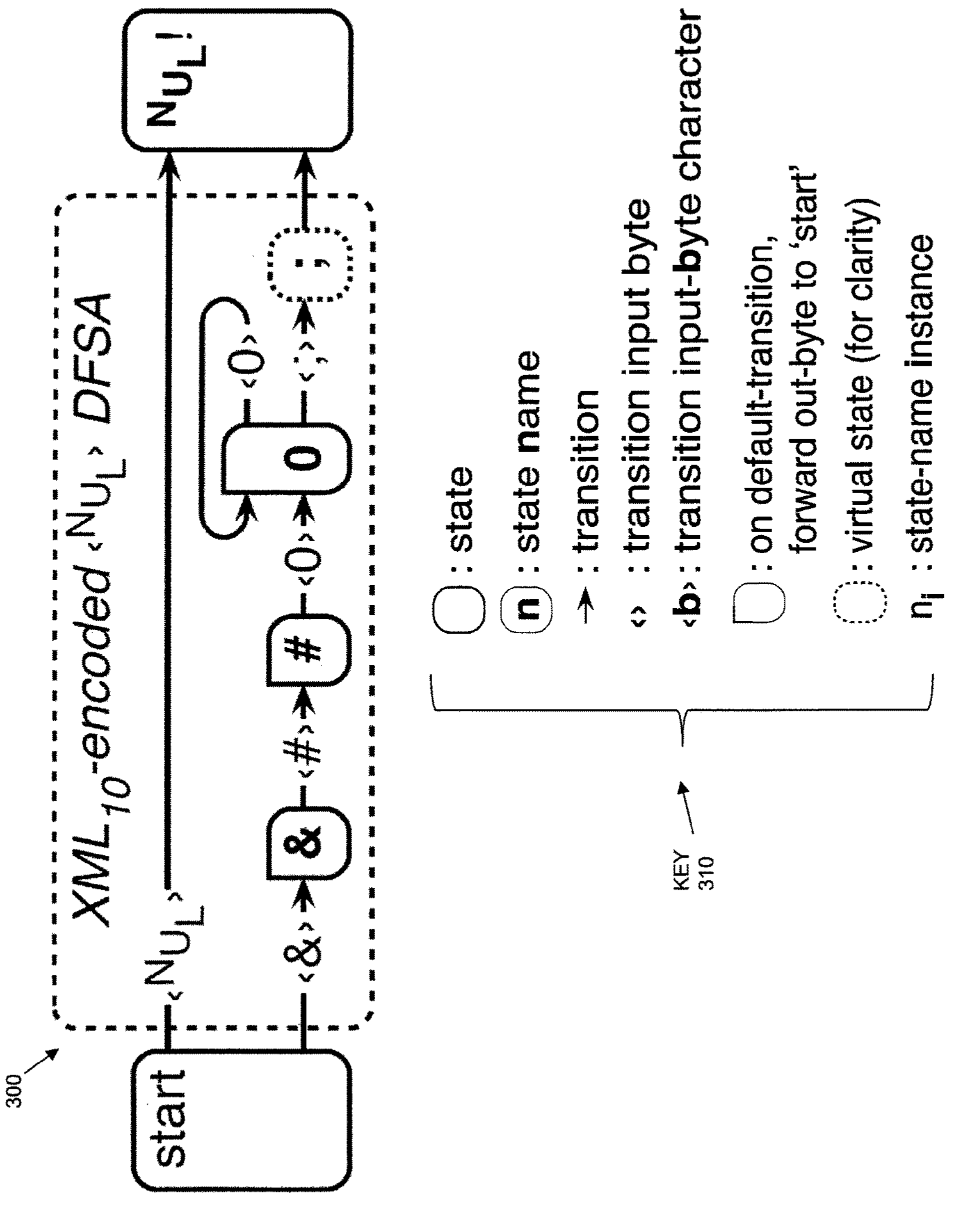
FIG. 3 shows an example of an input finite-state machine modeling computation for detecting singly encoded null-bytes encoded according to the decimal XML character encoding method.

FIG. 3 shows an example of an input finite-state machine 300 modeling computation for detecting singly encoded null-bytes encoded according to the decimal XML character encoding method, i.e. <&><#><0><;>, where the <0> could be repeated any number of times. A key 300 provides a guide to the specific symbols used in the finite-state machine 300 of FIG. 3, as well as in the other finite-state machines shown in subsequent figures. The finite-state machine 300 is an example of one of the Input Finite-State Machines 200 shown in FIG. 2, i.e. a finite-state machine that models computation for detecting an unencoded null-byte or a singly encoded null-byte that is encoded according to one of the character encoding methods in the set of character encoding methods. The transition characters in the finite-state machine 300 are the input-byte characters <␀>, <&>, <#>, <0> and <;>.

The computation modeled by the finite-state machine 300 is as follows: The finite-state machine 300 begins in the "start" state, and consumes input text one byte per state-transition, traversing the states according to the labelled transitions matching the byte consumed. From the "start" state, if a current input byte is an un-encoded null-byte ("<␀>"), proceed via the <␀> transition to the "␀!" null-byte alert state, indicating detection of a null-byte; else if the current input byte is <&>, proceed via the <&> transition to the "&" state; otherwise remain in the "start" state. From the "&" state, if the current input byte is <#>, proceed via the <#> transition to the "#" state; otherwise return to the "start" state and reprocess the current input byte.

From the "#" state, if the current input byte is <0>, proceed via the <0> transition to the "0" state; otherwise return to the "start" state and reprocess the current input byte.

From the "0" state, if the current input byte is <0>, return to the "0" state; otherwise, if the current input byte is <;>, proceed through the ";" virtual state to the "␀!" null-byte alert state indicating detection of a null-byte; otherwise return to the "start" state and reprocess the current input byte.

From the "␀!" state, if the entire input text has not been consumed, continue from the "start" state.

Figure 4:
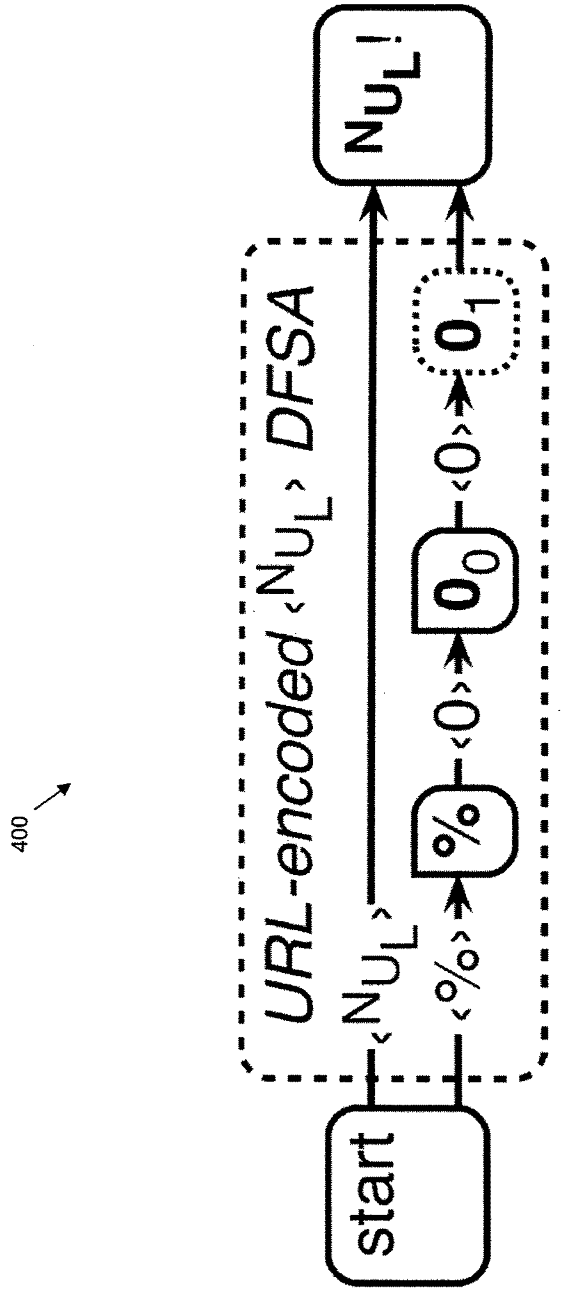
FIG. 4 shows an example of an input finite-state machine modeling computation for detecting singly encoded null-bytes encoded according to the URL character encoding method.

FIG. 4 shows an example of an input finite-state machine 400 modeling computation for detecting unencoded null-bytes or singly encoded null-bytes encoded according to the URL character encoding method, i.e. <%><0><0>. The finite-state machine 400 is an example of one of the Input Finite-State Machines 200 shown in FIG. 2, i.e. a finite-state machine that models computation for detecting a singly encoded null-byte that is encoded according to one of the character encoding methods in the set of character encoding methods. The transition characters in the finite-state machine 400 are the input-byte characters <%> and <0>.

The computation modeled by the finite-state machine 400 is as follows: The finite-state machine 400 begins in the "start" state, and consumes input text one byte per state-transition, traversing the states according to the labelled transitions matching the byte consumed. From the "start" state, if the current input byte is <␀>, proceed via the <␀> transition to the "␀!" final null-byte alert state, indicating detection of a null-byte; if instead the current input byte is <%>, proceed via the <%> transition to the "%" state; otherwise remain in the "start" state. From the "%" state, if the current input byte is <0>, proceed via the <0> transition to the "$0_0$" state; otherwise return to the "start" state and reprocess the current input byte.

From the "$0_0$" state, if the current input byte is <0>, proceed through the "$0_1$" virtual state to the "␀!" null-byte alert state indicating detection of a null-byte; otherwise return to the "start" state and reprocess the current input byte.

From the "␀!" state, if the entire input text has not been consumed, continue from the "start" state.

Figure 5:
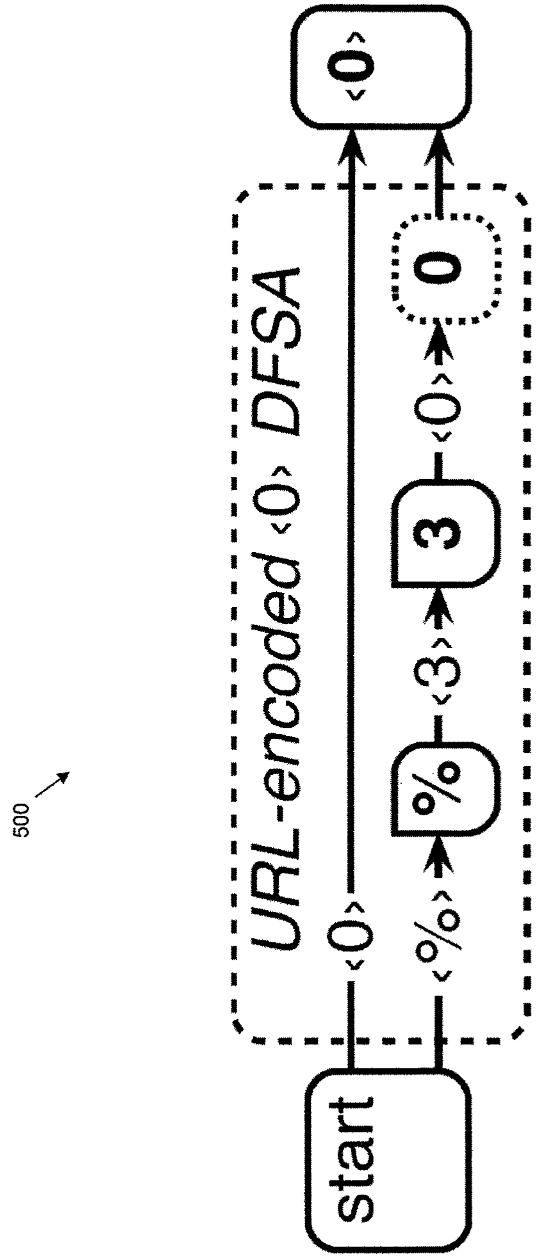
FIG. 5 shows an example of an additional finite-state machine modeling computation for detecting a zero (<0>) character encoded according to the URL character encoding method.

FIG. 5 shows an example of an additional finite-state machine 500 modeling computation for detecting a zero (<0>) character encoded according to the URL character encoding method, i.e. <%><3><0>. The (<0>) character is one of the characters used to singly-encode a null-byte according to the decimal XML character encoding method. The URL encoding of the zero (<0>) character is accordingly an individual character encoding from the URL character encoding method that is needed to multiply-encode a null-byte that is singly encoded using the decimal XML character encoding method. The finite-state machine 500 is therefore an example of one of the Additional FSMs 203 shown in FIG. 2, i.e. a finite-state machine that models detection of an individual character encoding needed to multiply-encode null-bytes singly encoded by another one of the character encoding methods in the set.

The computation modeled by the finite-state machine 500 is as follows: The finite-state machine 500 begins in the "start" state, and consumes input text one byte per state-transition, traversing the states according to the labelled transitions matching the byte consumed. From the "start" state, if the current input byte is <0>, proceed via the <0> transition to the "<0>" state, indicating detection of a <0> character; else if the current input byte is <%>, proceed via the <%> transition to the "%" state; otherwise remain in the "start" state. From the "%" state, if the current input byte is <3>, proceed via the <3> transition to the "3" state; otherwise return to the "start" state and reprocess the current input byte.

From the "3" state, if the current input byte is <0>, proceed through the "0" virtual state to the "<0>" state, indicating detection of a <0> character.

Figure 6:
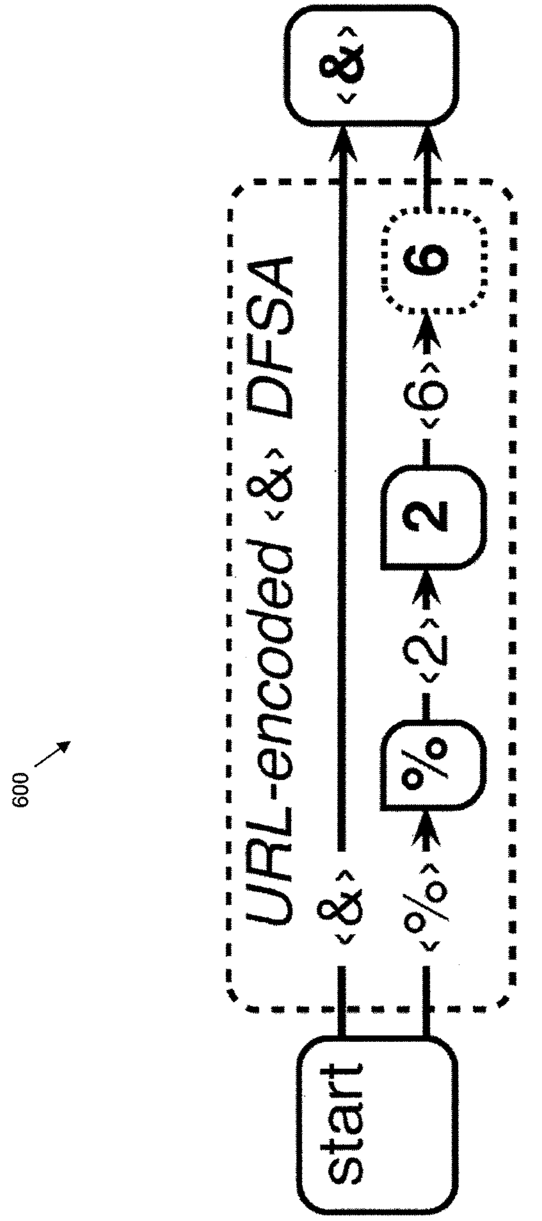
FIG. 6 shows an example of an additional finite-state machine modeling computation for detecting an ampersand (<&>) character encoded according to the URL character encoding method.

FIG. 6 shows an example of an additional finite-state machine 600 modeling computation for detecting an ampersand (<&>) character encoded according to the URL character encoding method, i.e. <%><2><6>. The ampersand (<&>) character is one of the characters used to singly-encode a null-byte according to the decimal or any other XML character encoding method. The URL encoding of the ampersand (<&>) character is accordingly an individual character encoding from the URL character encoding method that is needed to multiply-encode a null-byte that is singly encoded using the decimal XML character encoding method. The finite-state machine 600 is therefore an example of one of the Additional FSMs 203 shown in FIG. 2, i.e. a finite-state machine that models detection of an individual character encoding needed to multiply-encode null-bytes singly encoded by another one of the character encoding methods in the set.

The computation modeled by the finite-state machine 600 is as follows: The finite-state machine 600 begins in the "start" state, and consumes input text one byte per state-transition, traversing the states according to the labelled transitions matching the byte consumed. From the "start" state, if the current input byte is <&>, proceed via the <&> transition to the "<&>" state, indicating detection of an <&> character; otherwise, if the current input byte is <%>, proceed via the <%> transition to the "%" state; otherwise remain in the "start" state. From the "%" state, if the current input byte is <2>, proceed via the <2> transition to the "2" state; otherwise return to the "start" state and reprocess the current input byte.

From the "2" state, if the current input byte is <6>, proceed through the "6" virtual state to the "<&>" state, indicating detection of an <&> character.

Figure 7:
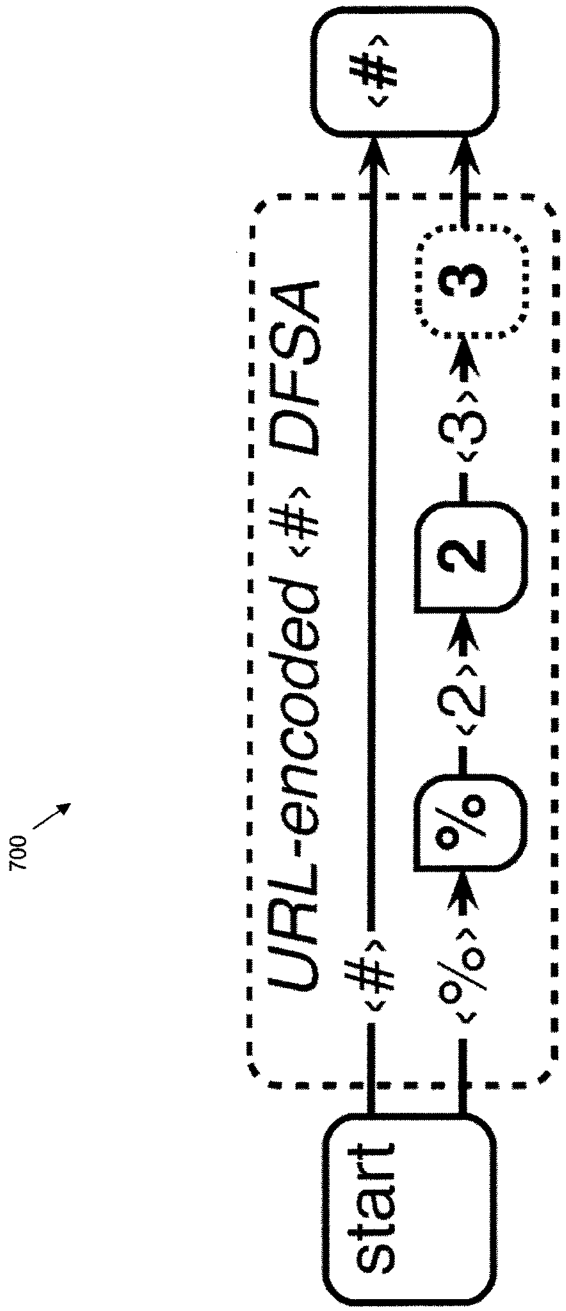
FIG. 7 shows an example of an additional finite-state machine modeling computation for detecting a number sign (<#>) character encoded according to the URL character encoding method.

FIG. 7 shows an example of an additional finite-state machine 700 modeling computation for detecting a number sign (<#>) character encoded according to the URL character encoding method, i.e. <%><2><3>. The number sign (<#>) character is one of the characters used to singly-encode a null-byte according to the decimal XML character encoding method. The URL encoding of the number sign (<#>) character is accordingly an individual character encoding from the URL character encoding method that is needed to multiply-encode a null-byte that is singly encoded using the decimal XML character encoding method. The finite-state machine 700 is therefore an example of one of the Additional FSMs 203 shown in FIG. 2, i.e. a finite-state machine that models detection of an individual character encoding needed to multiply-encode null-bytes singly encoded by another one of the character encoding methods in the set.

The computation modeled by the finite-state machine 700 is as follows: The finite-state machine 700 begins in the "start" state, and consumes input text one byte per state-transition, traversing the states according to the labelled transitions matching the byte consumed. From the "start" state, if the current input byte is <#>, proceed via the <#> transition to the "<#>" state, indicating detection of a <#> character; if instead the current input byte is <%>, proceed via the <%> transition to the "%" state; otherwise remain in the "start" state. From the "%" state, if the current input byte is <2>, proceed via the <2> transition to the "2" state; otherwise return to the "start" state and reprocess the current input byte.

From the "2" state, if the current input byte is <3>, proceed through the "3" virtual state to the "<#>" state, indicating detection of a <#> character.

Figure 8:
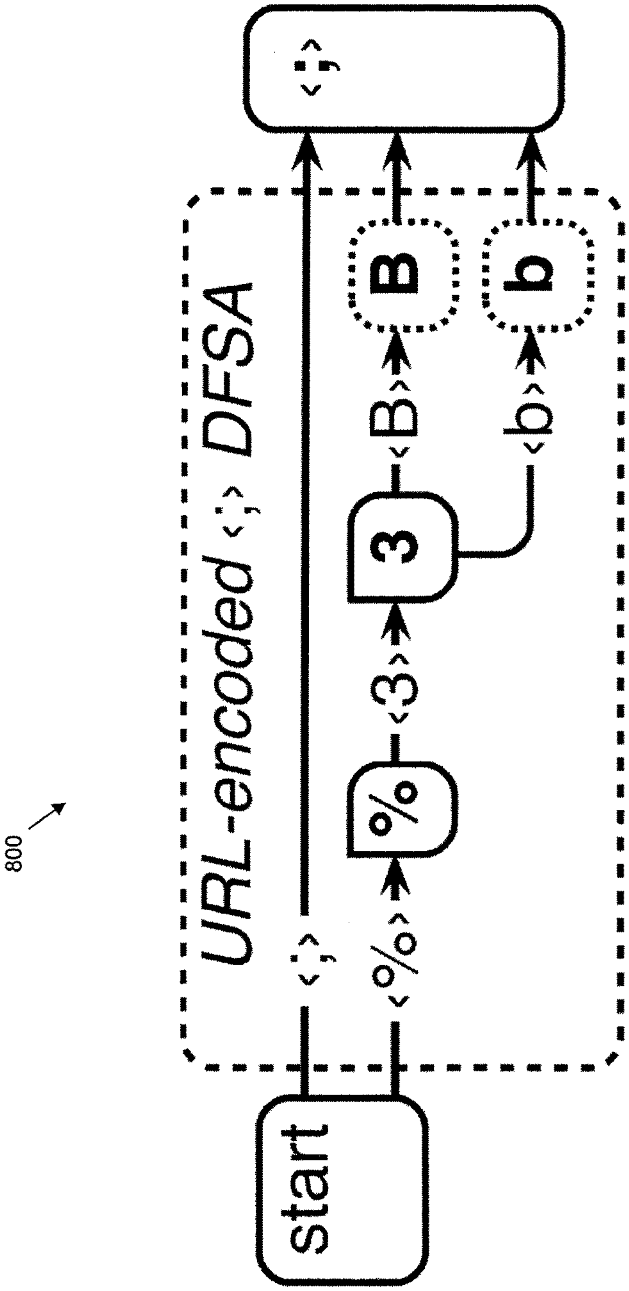
FIG. 8 shows an example of an additional finite-state machine modeling computation for detecting a semi-colon (<;>) character encoded according to the URL character encoding method.

FIG. 8 shows an example of an additional finite-state machine 800 modeling computation for detecting a semi-colon (<;>) character encoded according to the URL character encoding method, i.e. <%><3><B> or <%><3><b>. The semicolon (<;>) character is one of the characters used to singly-encode a null-byte according to the decimal XML character encoding method. The URL encoding of the semi-colon (<;>) character is accordingly an individual character encoding from the URL character encoding method that is needed to multiply-encode a null-byte that is singly encoded using the decimal XML character encoding method. The finite-state machine 800 is therefore an example of one of the Additional FSMs 203 shown in FIG. 2, i.e. a finite-state machine that models detection of an individual character encoding needed to multiply-encode null-bytes singly encoded by another one of the character encoding methods in the set.

The computation modeled by the finite-state machine 800 is as follows: The finite-state machine 800 begins in the "start" state, and consumes input text one byte per state-transition, traversing the states according to the labelled transitions matching the byte consumed. From the "start" state, if the current input byte is <;>, proceed via the <;> transition to the "<;>" state, indicating detection of a <;> character; otherwise, if the current input byte is <%>, proceed via the <%> transition to the "%" state; otherwise remain in the "start" state. From the "%" state, if the current input byte is <3>, proceed via the <3> transition to the "3" state; otherwise return to the "start" state and reprocess the current input byte.

From the "3" state, if the current input byte is <B>, proceed through the "B" virtual state to the "<;>" state, indicating detection of a <;> character. Also from the "3" state, if the current input byte is <b>, proceed through the "b" virtual state to the "<;>" state, indicating detection of a <;> character.

Figure 9:
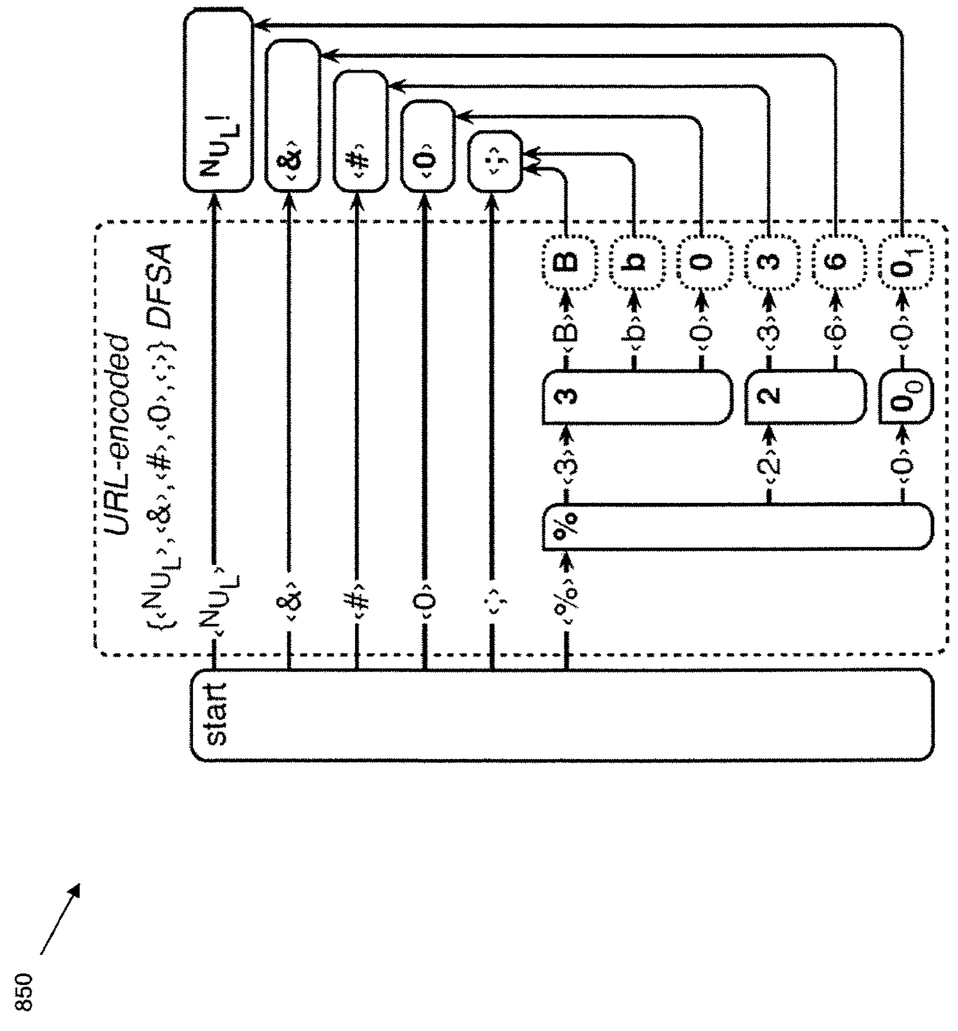
FIG. 9 shows an excerpt of the complete URL encoding method deterministic finite-state machine (DFSM) including only the paths needed to expand the transitions in the decimal XML encoded null-byte deterministic finite-state machine (DFSM)

FIG. 9 shows an excerpt 850 of the complete URL encoding method deterministic finite-state machine (DFSM) including only the paths needed to expand the transitions in the decimal XML encoded null-byte deterministic finite-state machine (DFSM). In other words, excerpt 850 is a minimal deterministic finite-state machine of the sum of the finite-state machines 400, 500, 600, 700 and 800, shown in FIGS. 4-8. In contrast to excerpt 850, a full URL-encoding DFSM would include all paths for URL-encoding of all possible 8-bit characters.

Figure 10:
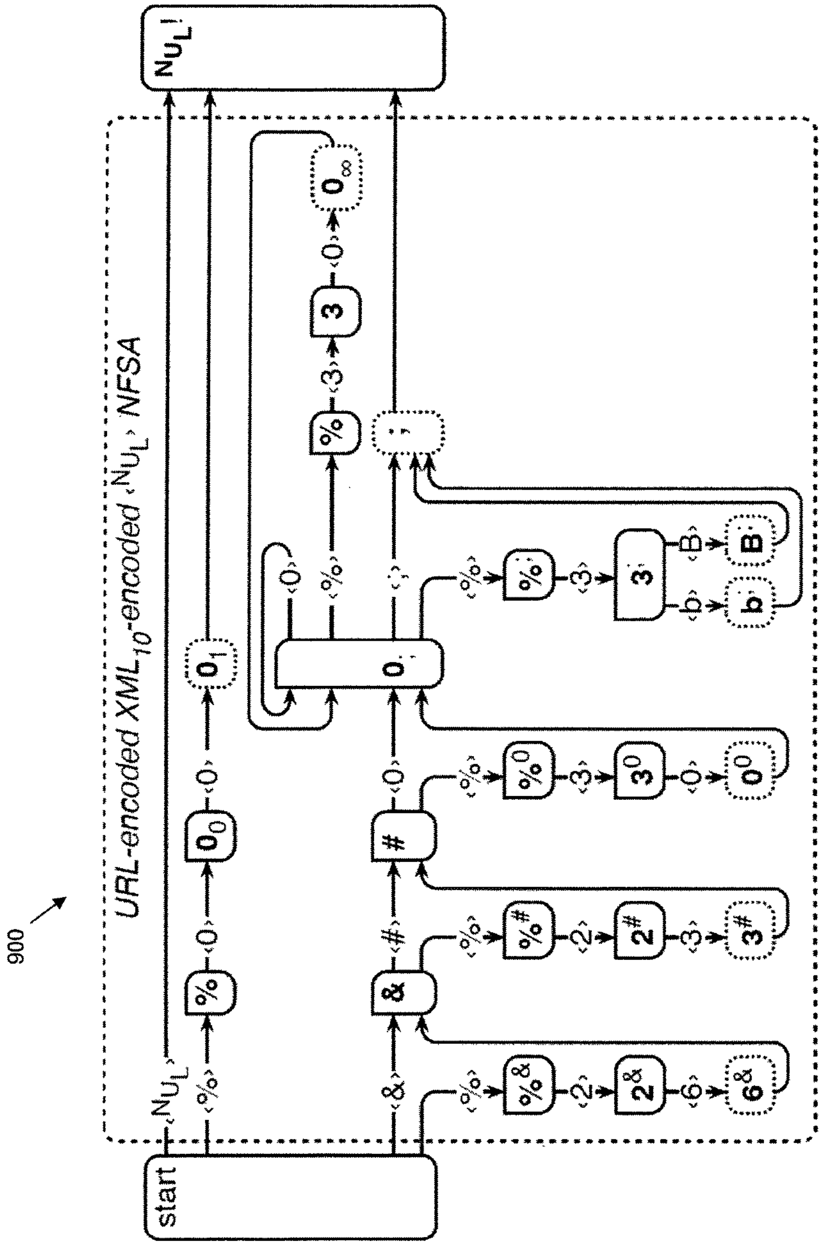
FIG. 10 shows an example of a composite finite-state machine that is the result of the convolution of the input finite-state machine modeling the detection of null-bytes encoded according to the decimal XML encoding method by the input finite-state machine modeling the URL encoding method.

FIG. 10 shows an example of a composite finite-state machine 900 that is the result of the convolution of the input finite-state machine modeling the detection of null-bytes encoded according to the decimal XML character encoding method (i.e. finite-state machine 300 in FIG. 3) by the URL encoding method deterministic finite-state machine (DFSM) (e.g. by excerpt 850 in FIG. 9). The finite-state machine 900 is an example of one of the Composite FSMs 205 shown in FIG. 2. In addition to the finite-state machine 300 of FIG. 3, the convolution (e.g. as performed in step 204 of FIG. 2) resulting in finite-state machine 900 takes as an additional input (e.g. as part of Additional FSMs 203 shown in FIG. 2) a finite-state machine modeling the URL encodings of the characters contained in a singly encoded null-byte encoded using the decimal XML character encoding method. An example of such a finite-state machine shown by excerpt 850 shown in FIG. 9, which is a minimal deterministic finite-state machine of the sum of the finite-state machines 400, 500, 600, 700 and 800, shown in FIGS. 4-8, and which models computation for detecting a URL encoding of any one of the characters resulting from singly-encoding a null-byte according to the decimal XML encoding method, i.e. the characters ampersand <&>, number sign <#>, zero <0> and semi-colon <;>.

The example finite-state machine 900 models computation for detecting i) naked un-encoded null-bytes, ii) singly encoded null-bytes encoded by the URL character encoding method, iii) singly encoded null-bytes encoded by the decimal XML character encoding method, and iv) multiply encoded null-bytes initially encoded by the decimal XML character encoding method in which one or more of the characters in the initial decimal XML encoding are further encoded using the URL character encoding method.

Figure 11:
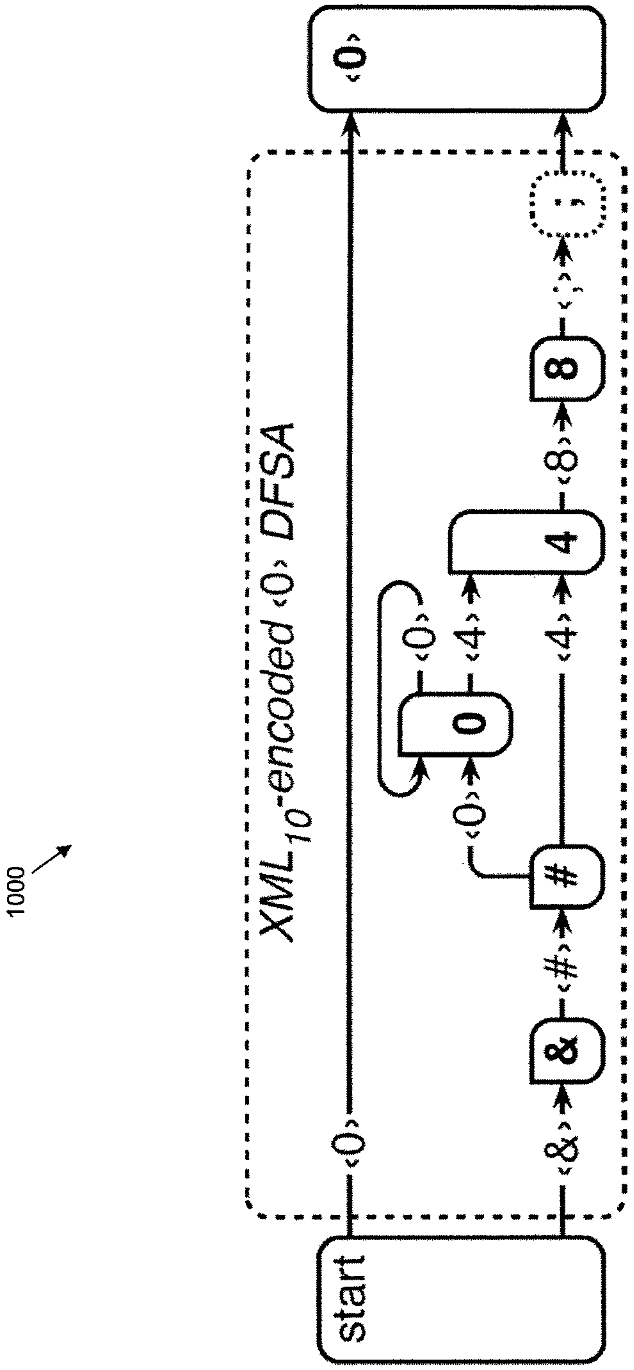
FIG. 11 shows an example of an additional finite-state machine modeling computation for detecting a zero (<0>) character encoded according to the decimal XML character encoding method.

FIG. 11 shows an example of an additional finite-state machine 1000 modeling computation for detecting a zero (<0>) character encoded according to the decimal XML character encoding method, i.e. <&><#><0><4><8>, in which the <0> between the <#> and the <4> may be repeated any number of times. The zero (<0>) character is one of the characters used to singly-encode a null-byte according to the URL character encoding method. The decimal XML encoding of the zero (<0>) character is accordingly an individual character encoding from the decimal XML character encoding method that is needed to multiply-encode a null-byte that is singly encoded using the URL character encoding method. The finite-state machine 1000 is therefore an example of one of the Additional FSMs 203 shown in FIG. 2, i.e. a finite-state machine that models detection of an individual character encoding needed to multiply-encode null-bytes singly encoded by another one of the character encoding methods in the set.

The computation modeled by the finite-state machine 1000 is as follows: The finite-state machine 1000 begins in the "start" state, and consumes input text one byte per state-transition, traversing the states according to the labelled transitions matching the byte consumed. From the "start" state, if the current input byte is <0>, proceed via the <0> transition to the "<0>" state, indicating detection of a <0> character; if instead the current input byte is <&>, proceed via the <&> transition to the "&" state; otherwise remain in the "start" state. From the "&" state, if the current input byte is <#>, proceed via the <#> transition to the "#" state; otherwise return to the "start" state and reprocess the current input byte.

From the "#" state, if the current input byte is <0>, proceed via the <0> transition to the "0" state; else if the current input byte is <4>, proceed via the <4> transition to the "4" state; otherwise return to the "start" state and reprocess the current input byte.

From the "0" state, if the current input byte is <0>, return to the "0" state; if instead the current input byte is <4>, proceed via the <4> transition to the "4" state; otherwise return to the "start" state and reprocess the current input byte.

From the "4" state, if the current input byte is <8> proceed via the <8> transition to the "8" state; otherwise return to the "start" state and reprocess the current input byte.

From the "8" state, if the current input byte is <;> proceed via the <;> transition through the virtual ";" state to the "<0>" state, indicating detection of a <0> character; otherwise return to the "start" state and reprocess the current input byte.

Figure 12:
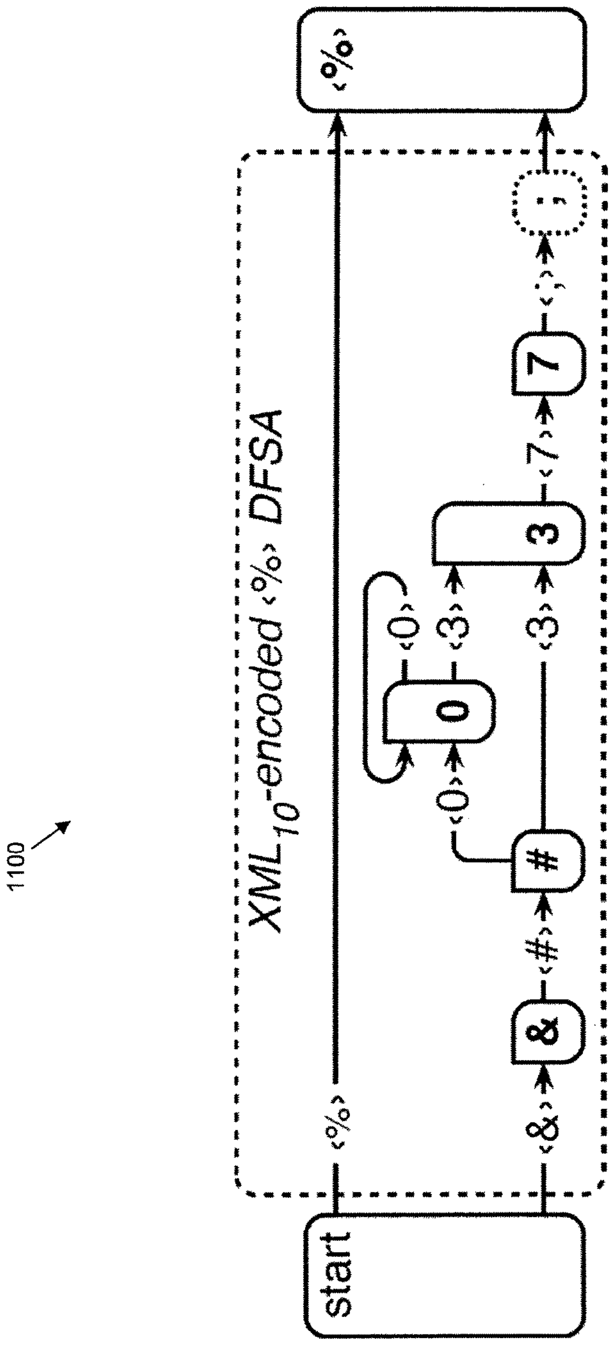
FIG. 12 shows an example of an additional finite-state machine modeling computation for detecting a percent (<%>) character encoded according to the decimal XML character encoding method.

FIG. 12 shows an example of an additional finite-state machine 1100 modeling computation for detecting a percent (<%>) character encoded according to the decimal XML character encoding method, i.e. <&><#><0><3><7>, in which the <0> between the <#> and the <3> may be repeated any number of times. The percent (<%>) character is one of the characters used to singly-encode a null-byte according to the URL character encoding method. The decimal XML encoding of the percent (<%>) character is accordingly an individual character encoding from the decimal XML character encoding method that is needed to multiply-encode a null-byte that is singly encoded using the URL character encoding method. The finite-state machine 1100 is therefore an example of one of the Additional FSMs 203 shown in FIG. 2, i.e. a finite-state machine that models detection of an individual character encoding needed to multiply-encode null-bytes singly encoded by another one of the character encoding methods in the set.

The computation modeled by the finite-state machine 1100 is as follows: The finite-state machine 1100 begins in the "start" state, and consumes input text one byte per state-transition, traversing the states according to the labelled transitions matching the byte consumed. From the "start" state, if the current input byte is <%>, proceed via the <%> transition to the "<%>" state, indicating detection of a <%> character; if instead the current input byte is <&>, proceed via the <&> transition to the "&" state; otherwise remain in the "start" state. From the "&" state, if the current input byte is <#>, proceed via the <#> transition to the "#" state; otherwise return to the "start" state and reprocess the current input byte.

From the "#" state, if the current input byte is <0>, proceed via the <0> transition to the "0" state; otherwise, if the current input byte is <3>, proceed via the <3> transition to the "3" state; otherwise return to the "start" state and reprocess the current input byte.

From the "0" state, if the current input byte is <0>, return to the "0" state; otherwise if the current input byte is <3>, proceed via the <3> transition to the "3" state; otherwise return to the "start" state and reprocess the current input byte.

From the "3" state, if the current input byte is <7> proceed via the <7> transition to the "7" state; otherwise return to the "start" state and reprocess the current input byte.

Figure 13:
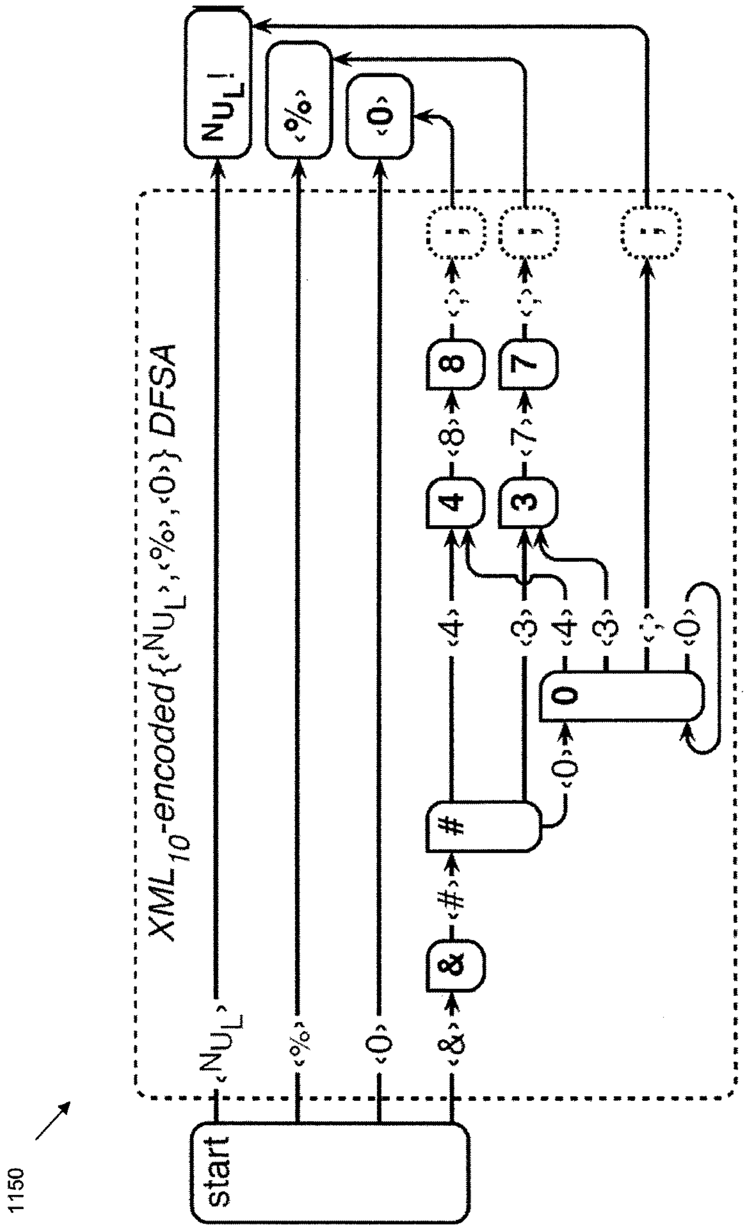
FIG. 13 shows an excerpt of the complete decimal XML encoding method deterministic finite-state machine (DFSM) including only the paths needed to expand the transitions in the URL encoded null-byte deterministic finite-state machine (DFSM)

From the "7" state, if the current input byte is <;> proceed via the <;> transition through the virtual ";" state to the "<%>" state, indicating detection of a <%> character; otherwise return to the "start" state and reprocess the current input byte. FIG. 13 shows an excerpt 1150 of the complete decimal XML encoding method deterministic finite-state machine (DFSM), including only the paths needed to expand the transitions in the URL encoded null-byte deterministic finite-state machine (DFSM). In other words, excerpt 1150 is a minimal deterministic finite-state machine of the sum of the finite-state machines 300, 1000 and 1100, shown in FIGS. 3, 11 and 12. In contrast to excerpt 1150, a full decimal XML encoding DFSM would include all paths for decimal XML encoding of all possible 8-bit characters.

Figure 14:
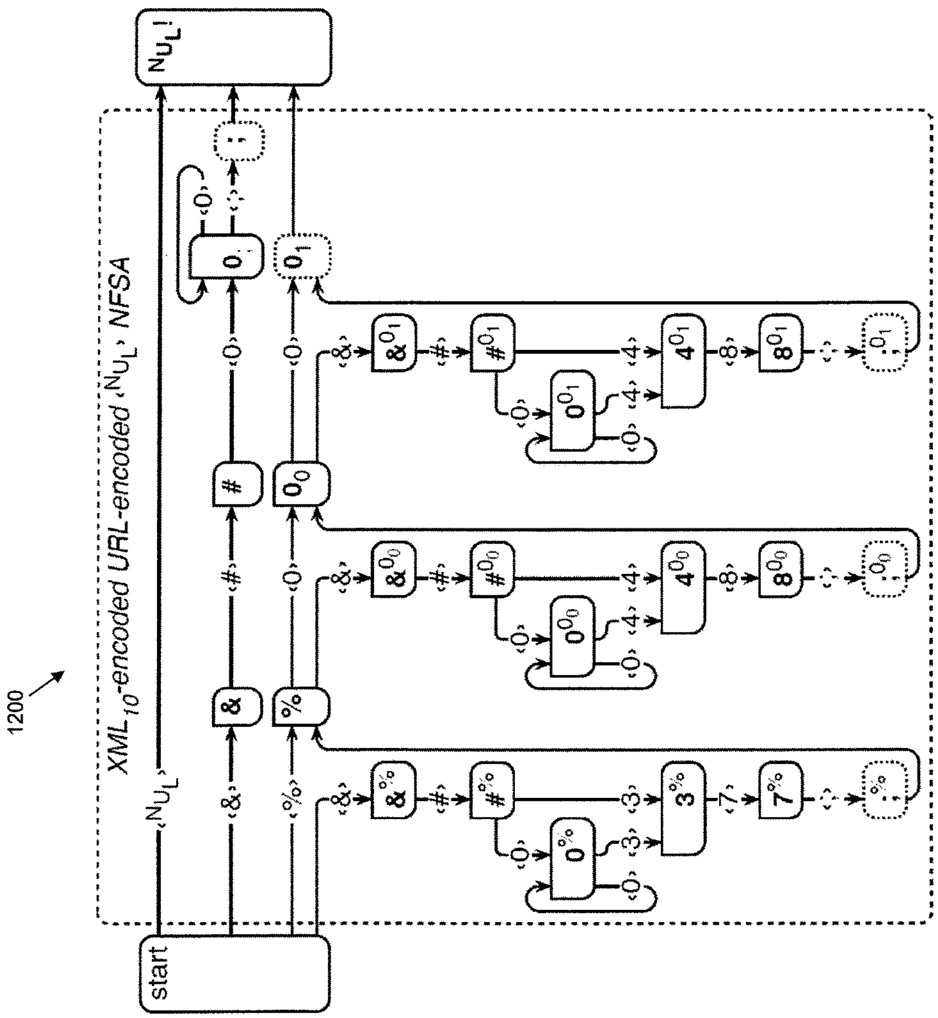
FIG. 14 shows an example of a composite finite-state machine that is the result of the convolution the input finite-state machine modeling the detection of null-bytes encoded according to the URL encoding method by the input finite-state machine modeling the decimal XML encoding method.

FIG. 14 shows an example of a composite finite-state machine 1200 that is the result of the convolution of the input finite-state machine modeling the detection of null-bytes encoded according to the URL encoding method (i.e. finite-state machine 400 in FIG. 4) by the decimal XML encoding method deterministic finite-state machine (e.g. by excerpt 1150 in FIG. 13). The finite-state machine 1200 is an example of one of the Composite FSMs 205 shown in FIG. 2. In addition to the finite-state machine 400 of FIG. 4, the convolution (e.g. as performed in step 204 of FIG. 2) resulting in finite-state machine 1200 takes as an additional input (e.g. as part of Additional FSMs 203 shown in FIG. 2) a finite-state machine modeling the decimal XML encodings of the characters contained in a singly encoded null-byte encoded using the URL character encoding method. An example of such a finite-state machine is shown by excerpt 1150 shown in FIG. 13, which is a minimal deterministic finite-state machine of the sum of the finite-state machines 300, 1000 and 1100, shown in FIGS. 3, 11 and 12, and which models computation for detecting a decimal XML encoding of any one of the characters resulting from singly-encoding a null-byte according to the URL encoding method, i.e. the characters zero <0> and percent sign <%>.

The example finite-state machine 1200 models computation for detecting i) naked un-encoded null-bytes, ii) singly encoded null-bytes encoded by the decimal XML character encoding method, iii) singly encoded null-bytes encoded by the URL character encoding method, and iv) multiply encoded null-bytes initially encoded by the URL character encoding method in which one or more of the characters in the initial URL encoding are further encoded using the decimal XML character encoding method.

Figure 15:
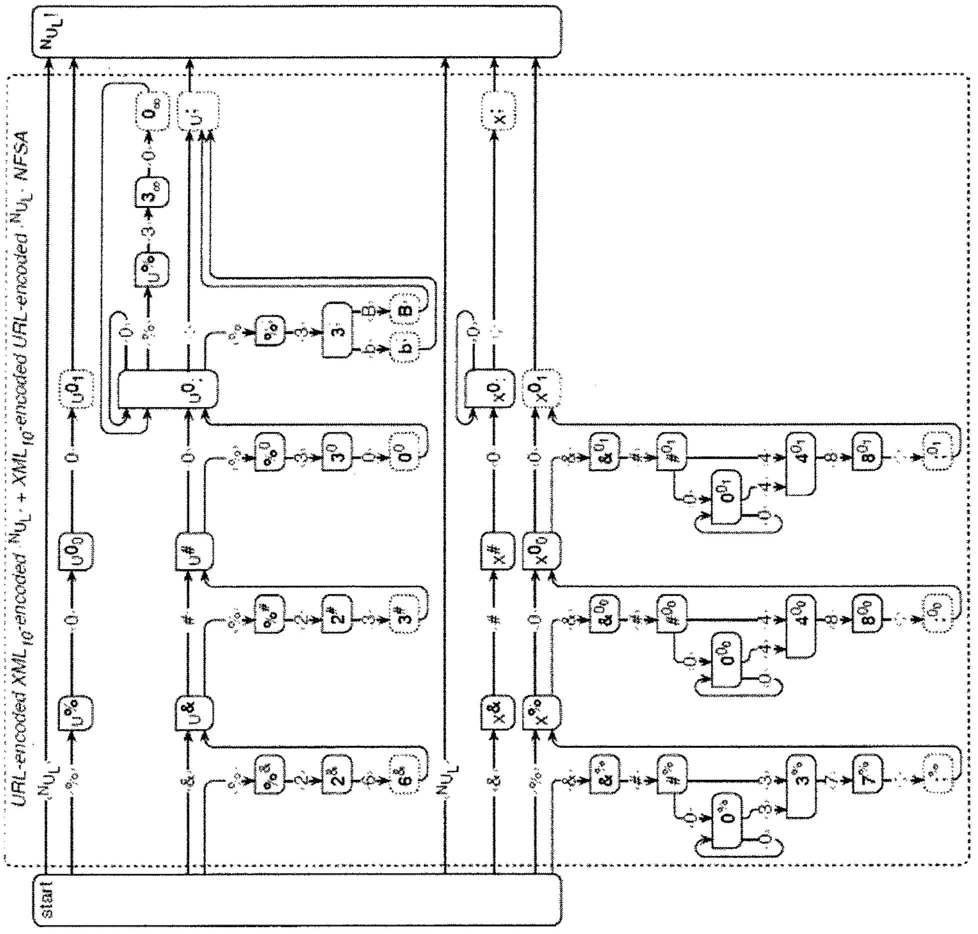
FIG. 15 shows an example of a non-deterministic finite-state machine that is the sum of the composite finite-state machine of FIG. 10 and the composite finite-state machine of FIG. 14.

FIG. 15 shows an example of a non-deterministic finite-state machine 1300 that is the sum of the composite finite-state machine 900 of FIG. 10 and the composite finite-state machine 1200 of FIG. 14. Non-deterministic finite-state machine 1300 is an example of the NFSM 207 shown in FIG. 2.

Figure 16:
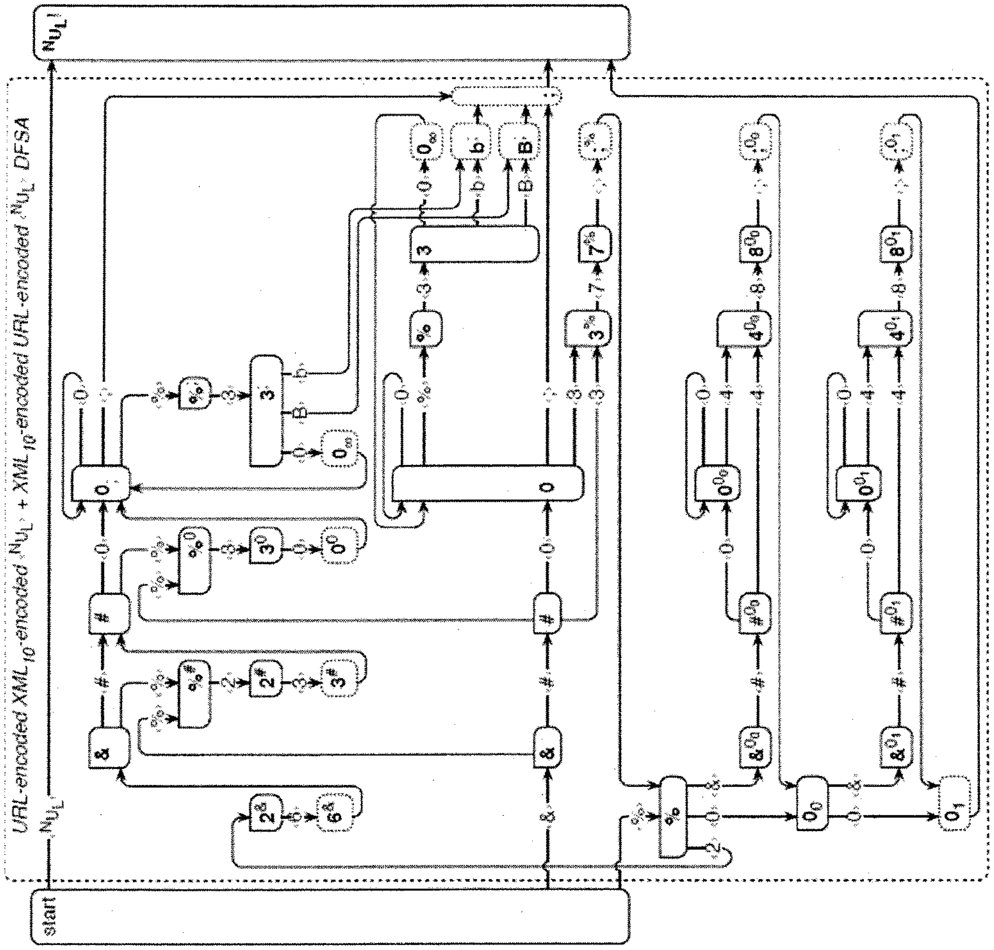
FIG. 16 shows an example of a minimized deterministic finite-state machine that is generated from non-deterministic finite-state machine of FIG. 15.

FIG. 16 shows an example of a minimized, deterministic finite-state machine 1400 that is generated from non-deterministic finite-state machine 1300 of FIG. 15 through the sub-steps 208 and 210 of FIG. 2. Accordingly, the minimized, deterministic finite-state machine 1400 is an example of Minimal DFSM 212 shown in FIG. 2.

Figure 17:
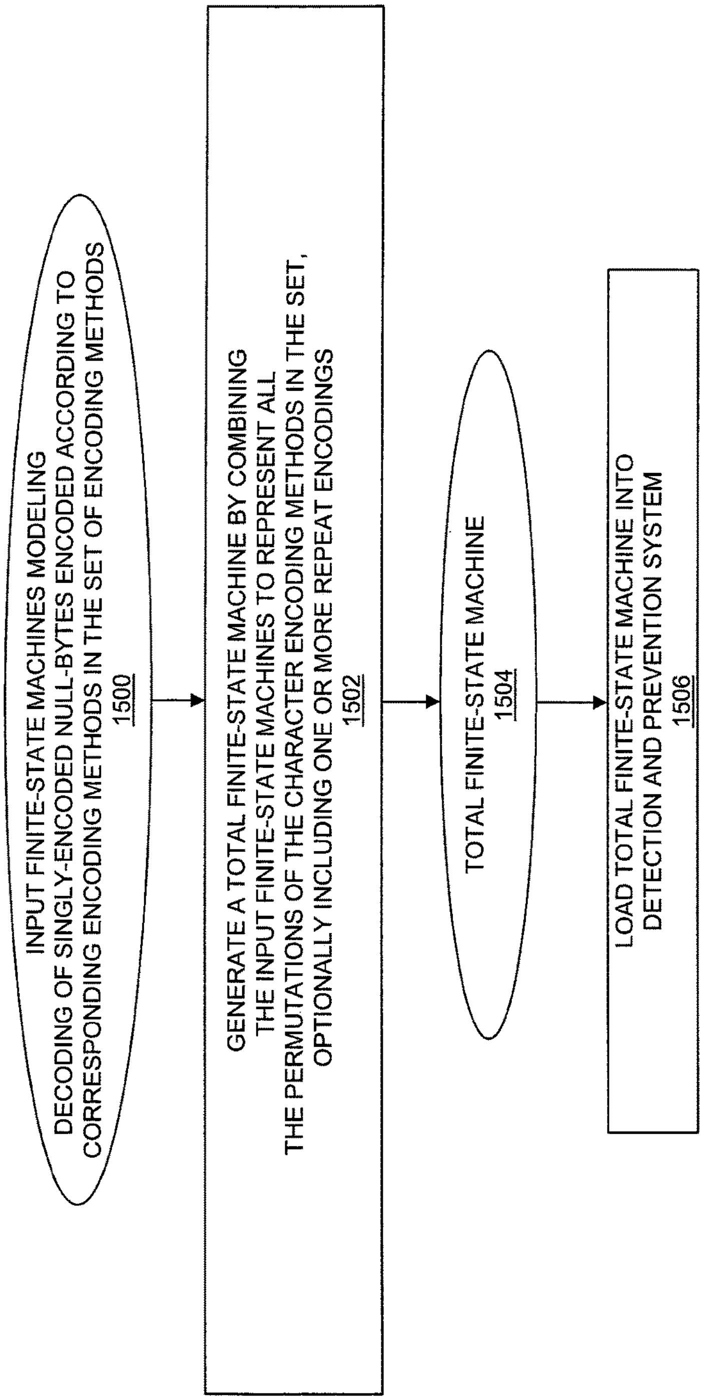
FIG. 17 is a flow chart illustrating steps performed during operation of an alternative embodiment of the disclosed system, to generate an output total finite-state machine based on input finite-state machines modeling decoding of singly encoded null-bytes encoded according to corresponding encoding methods in a set of encoding methods, the total finite-state machine to be loaded into and used by the attack detection and prevention system to decode and detect unencoded, singly encoded, and multiply encoded null-bytes.

FIG. 17 is a flow chart illustrating steps performed during operation of an alternative embodiment of the disclosed system, to generate an output total finite-state machine based on input finite-state machines modeling decoding of singly encoded null-bytes encoded according to corresponding encoding methods in a set of encoding methods, the total finite-state machine to be loaded into and used by the attack detection and prevention system to decode and detect un-encoded, singly encoded, and multiply encoded null-bytes. The steps of FIG. 2 may be performed by an alternative embodiment of the Finite-State Machine Generator 110 shown in FIG. 1. As shown in FIG. 17, in the alternative embodiment, the Directed Graphs 108 are embodied as Input Finite-State Machines 1500. Each of Input Finite-State Machines 200 is a finite-state machine that models computation for decoding and detecting a singly encoded null-byte that is encoded according to a corresponding one of the encoding methods in the set of encoding methods. In the alternative embodiment of the disclosed system, at step 1502, the Input Finite-State Machines 1500 are used to generate an Output Finite-State Machine 112 (FIG. 1) that is a total finite-state machine that represents all permutations of the character encoding methods in the set of character encoding methods, as shown by Total Finite-State Machine 1504. The encoding permutations represented by Total Finite-State Machine 1504 may optionally include one or more repeat encodings, e.g. up to a specified maximum number of repeats.

Further in the alternative embodiment, the disclosed system (e.g. Finite-State Machine Generator 110) may generate a state-transition table representing the Total Finite-State Machine 1504. Such a state-transition table representing Total Finite-State Machine 1504 may be generated using conventional techniques.

At step 1506, the disclosed system (e.g. Finite-State Machine Generator 110) loads the state-transition table representing Total Finite-State Machine 1504 into the Attack Detection and Prevention System 114 shown in FIG. 1, which then operates based on the state-transition table representing Total Finite-State Machine 1504 to detect and decode all encodings of null-bytes in the received text data (e.g. Text Data 116 in FIG. 1), and then search the resulting text for un-encoded null-bytes, thereby providing exhaustive testing for injected null-bytes in the received text data that may be un-encoded, or singly encoded, or even multiply encoded using one or more of the character encoding methods in the set of character encoding methods, and where the multiple encodings may include one or more repeat encodings using individual ones of the character encoding methods in the set of character encoding methods.

Figure 18:
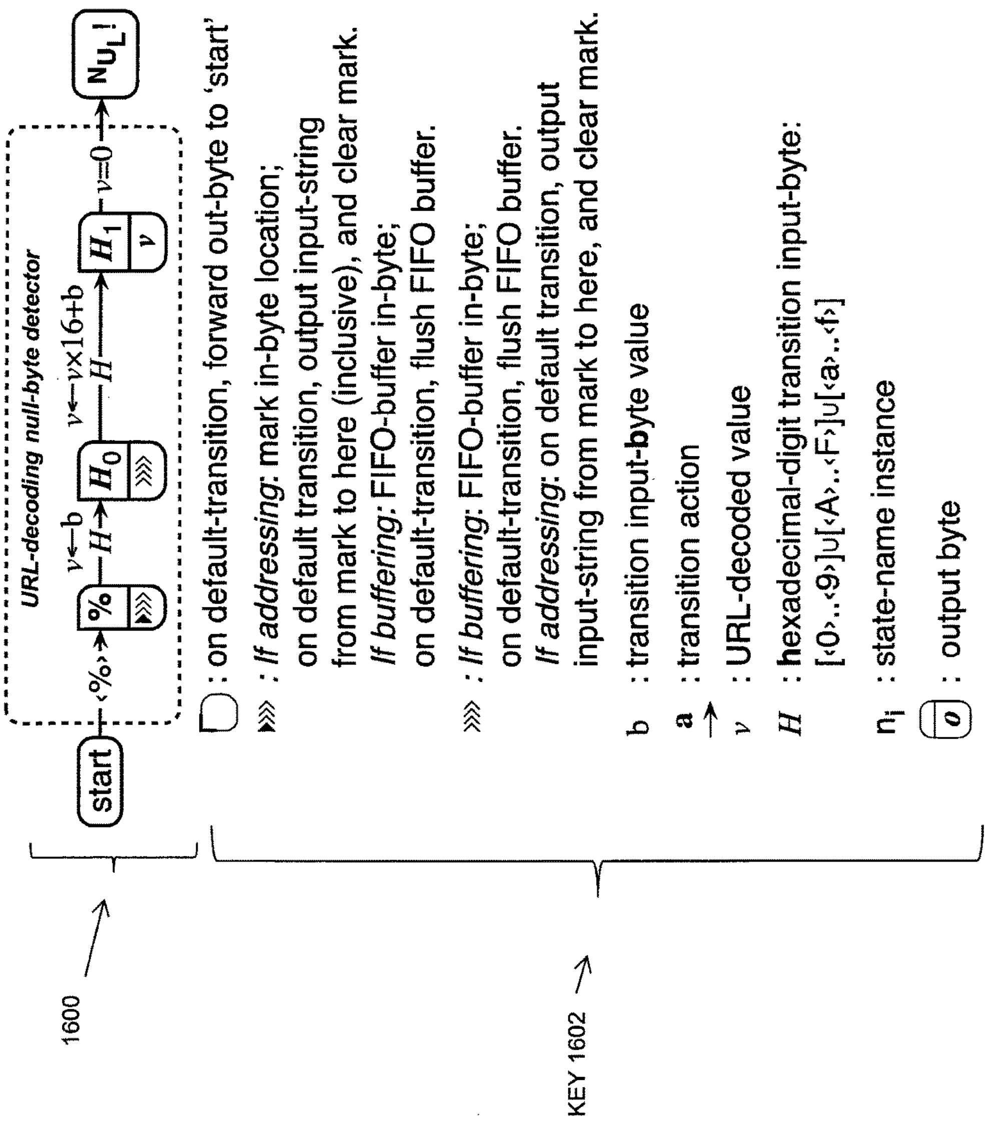
FIG. 18 shows an example of an input finite-state machine modeling computation for decoding and detecting singly encoded null-bytes encoded according to the URL character encoding method.

FIG. 18 shows an example of an input finite-state machine 1600 modeling computation for decoding and detecting singly encoded null-bytes encoded according to the URL character encoding method. A key 1602 provides a guide to the specific symbols used in the finite-state machine 1600 of FIG. 18, as well as in the other finite-state machines shown in subsequent figures. The finite-state machine 1600 is an example of one of the Input Finite-State Machines 1500 shown in FIG. 17, i.e. a finite-state machine that models computation for decoding and detecting a singly encoded null-byte that is encoded according to one of the character encoding methods in the set of character encoding methods.

The computation modeled by the finite-state machine 1600 is as follows: To detect and decode an embedded URL-encoded null-byte, begin in the 'start' state, and input the input text one byte per state-transition, traversing the states according to the labelled transitions matching the byte input, while also updating and testing the state variable v as indicated. If the finite-state machine 1600 is to be pipelined with another decoding and detecting finite-state machine, then it also outputs the URL-decoded text string, either buffering the string as it is input, or marking false-starts in the input string.

From the "start" state, if the input byte is "%", proceed via the <%> transition to the "%" state; otherwise output the input byte and return to the "start" state.

On transitioning to the "%" state, also either mark the location of the input byte in the input text (if the input text is persistent), or FIFO-buffer the input byte (e.g. if the input text is ephemeral).

From the "%" state, if the input byte is a case-insensitive hexadecimal digit ([<0> . . . <9>]∪[<A> . . . <F>]∪[<a> . . . <f>]), proceed via the H hexadecimal-digit transition to the "$H_0$" state, setting the state variable v to the hexadecimal value b of the input byte; otherwise, return to the "start" state to reprocess the current input byte, outputting the false-start either by copying the input string from the mark up to the current input byte and then clearing the mark, or by flushing the FIFO buffer.

On transitioning to the "$H_0$" state, if the input text is ephemeral, also append the input byte to the FIFO buffer.

From the "$H_0$" state, if the input byte is a case-insensitive hexadecimal digit ([<0> . . . <9>]∪[<A> . . . <F>]∪[<a> . . . <f>]), proceed via the H hexadecimal-digit transition to the "$H_1$" state, multiplying the state variable v by 16 (or, equivalently, left-shifting it by 4) and adding the hexadecimal value b of the input byte; otherwise, return to the "start" state to reprocess the current input byte, outputting the false-start either by copying the input string from the mark up to the current input byte and then clearing the mark, or by flushing the FIFO buffer.

On transitioning to the "$H_1$" state, also output the state variable v and clear either the mark or the FIFO buffer.

Figure 19:
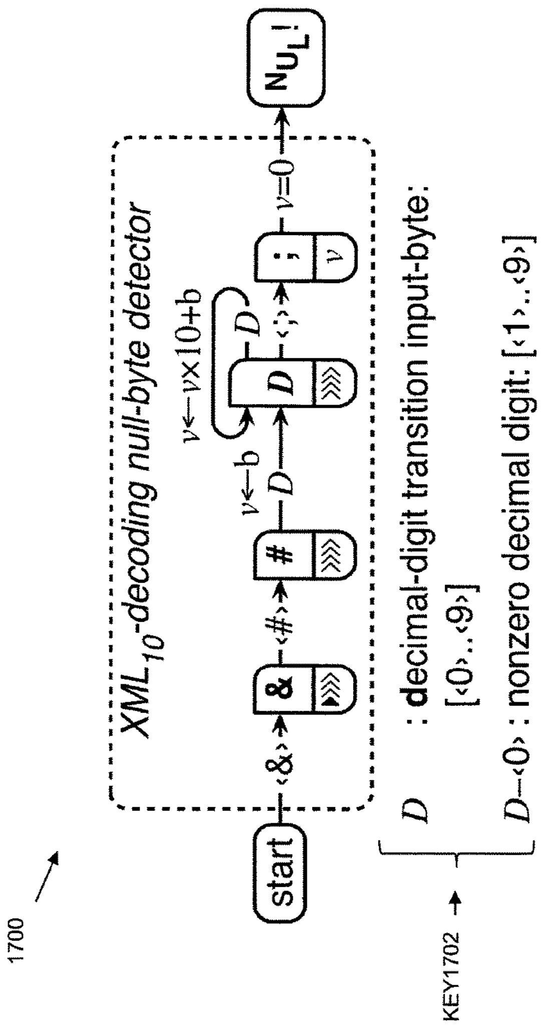
FIG. 19 shows an example of an input finite-state machine modeling computation for decoding and detecting singly encoded null-bytes encoded according to the decimal XML character encoding method.

FIG. 19 shows an example of an input finite-state machine 1700 modeling computation for decoding and detecting singly encoded null-bytes encoded according to the decimal XML character encoding method. A key 1702 provides a guide to the specific symbols used in the finite-state machine 1700 of FIG. 19, as well as in the other finite-state machines shown in subsequent figures. The finite-state machine 1700 is an example of one of the Input Finite-State Machines 1500 shown in FIG. 17, i.e. a finite-state machine that models computation for decoding and detecting a singly encoded null-byte that is encoded according to one of the character encoding methods in the set of character encoding methods. The computation modeled by the finite-state machine 1700 is as illustrated in FIG. 19, and will be evident to those skilled in the art from FIG. 19 further in view of the above description, including the description of the computation modeled by the finite-state machine 1600 of FIG. 18.

Figure 20:
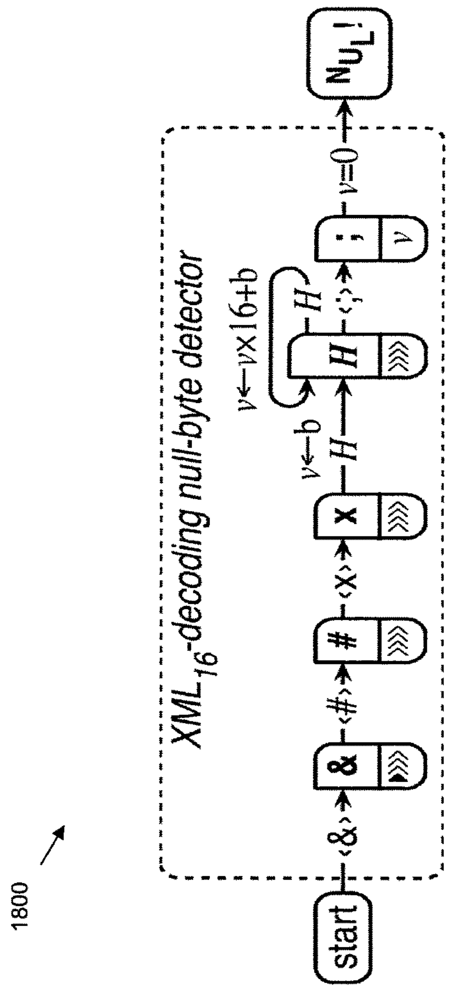
FIG. 20 shows an example of an input finite-state machine modeling computation for decoding and detecting singly encoded null-bytes encoded according to the hexadecimal XML character encoding method.

FIG. 20 shows an example of an input finite-state machine 1800 modeling computation for decoding and detecting singly encoded null-bytes encoded according to the hexadecimal XML character encoding method. The finite-state machine 1800 is an example of one of the Input Finite-State Machines 1500 shown in FIG. 17, i.e. a finite-state machine that models computation for decoding and detecting a singly encoded null-byte that is encoded according to one of the character encoding methods in the set of character encoding methods. The computation modeled by the finite-state machine 1800 is as illustrated in FIG. 20, and will be evident to those skilled in the art from FIG. 20 further in view of the above description, including the description of the computation modeled by the finite-state machine 1600 of FIG. 18.

Figure 21:
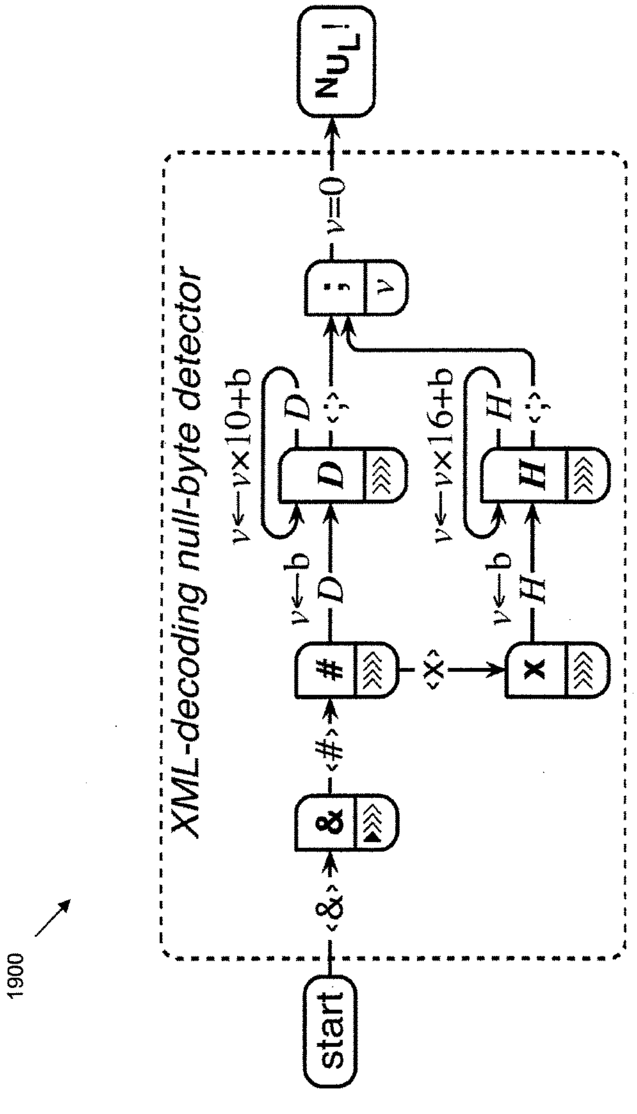
FIG. 21 shows an example of a finite-state machine modeling computation for decoding and detecting singly encoded null-bytes encoded according to either the decimal XML character encoding method or the hexadecimal XML character encoding method.

FIG. 21 shows an example of a finite-state machine 1900 modeling computation for decoding and detecting singly encoded null-bytes encoded according to either the decimal XML character encoding method or the hexadecimal XML character encoding method. The finite-state machine 1900 may be generated (e.g. in Finite-State Machine Generator 110) by combining the finite-state machine 1700 of FIG. 19 and the finite-state machine 1800 of FIG. 20. The computation modeled by the finite-state machine 1900 is as illustrated in FIG. 21, and will be evident to those skilled in the art from FIG. 21 further in view of the above description, including the description of the computation modeled by the finite-state machine 1600 of FIG. 18, and specifically in view of finite-state machines 1700 and 1800 shown in FIGS. 19 and 20 respectively.

Figure 22:
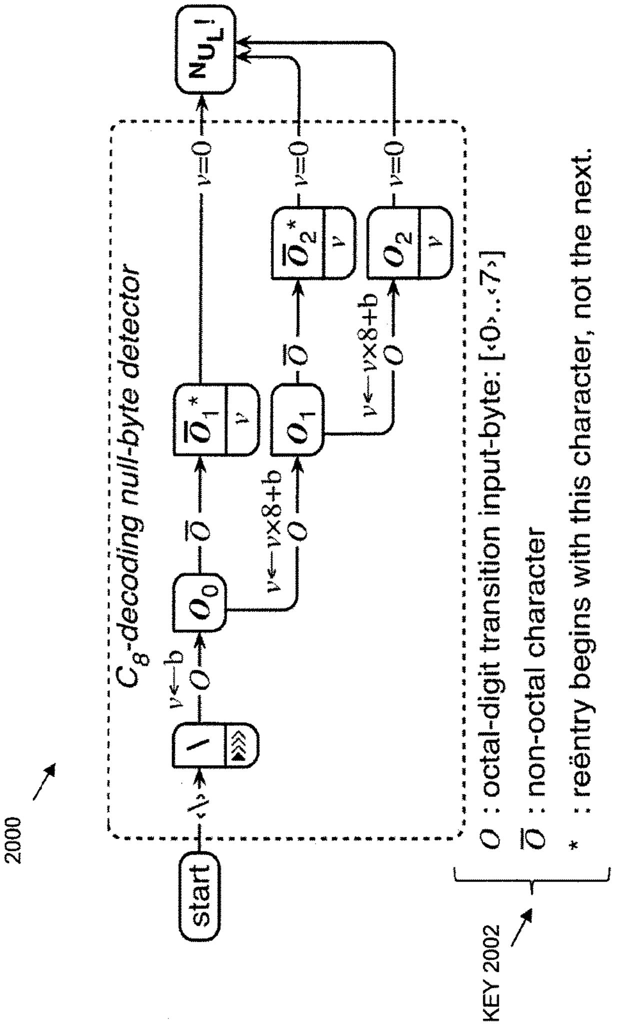
FIG. 22 shows an example of an input finite-state machine modeling computation for decoding and detecting singly encoded null-bytes encoded according to the octal C backslash-escape sequence character encoding method.
Figure 24:
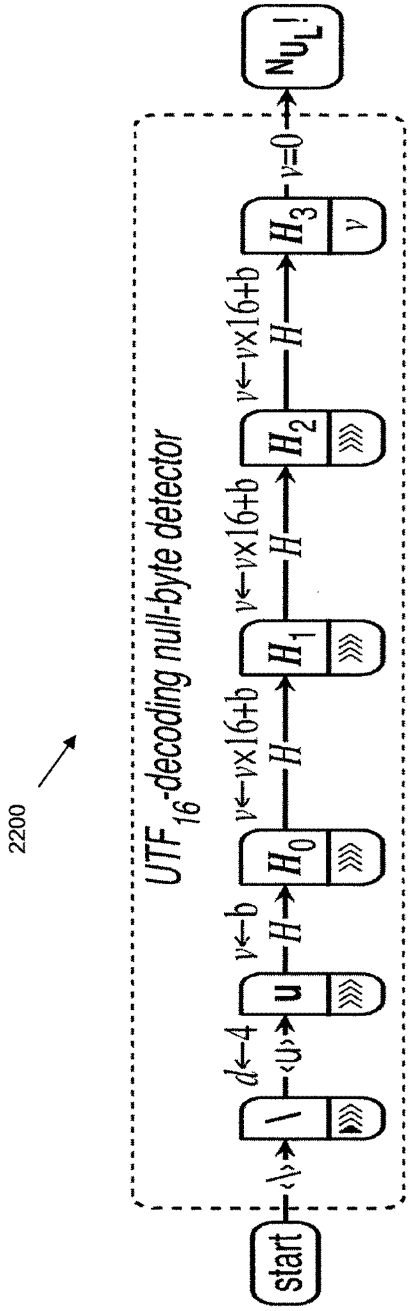
FIG. 24 shows an example of an input finite-state machine modeling computation for decoding and detecting singly encoded null-bytes encoded according to the UTF-16 character encoding method.

FIG. 24 shows an example of an input finite-state machine 2000 modeling computation for decoding and detecting singly encoded null-bytes encoded according to the octal C backslash-escape sequence character encoding method. A key 2002 provides a guide to the specific symbols used in the finite-state machine 2000 of FIG. 22, as well as in the other finite-state machines shown in subsequent figures. The finite-state machine 2000 is an example of one of the Input Finite-State Machines 1500 shown in FIG. 17, i.e. a finite-state machine that models computation for decoding and detecting a singly encoded null-byte that is encoded according to one of the character encoding methods in the set of character encoding methods. The computation modeled by the finite-state machine 2000 is as illustrated in FIG. 22, and will be evident to those skilled in the art from FIG. 22 further in view of the above description, including the description of the computation modeled by the finite-state machine 1600 of FIG. 18.

Figure 23:
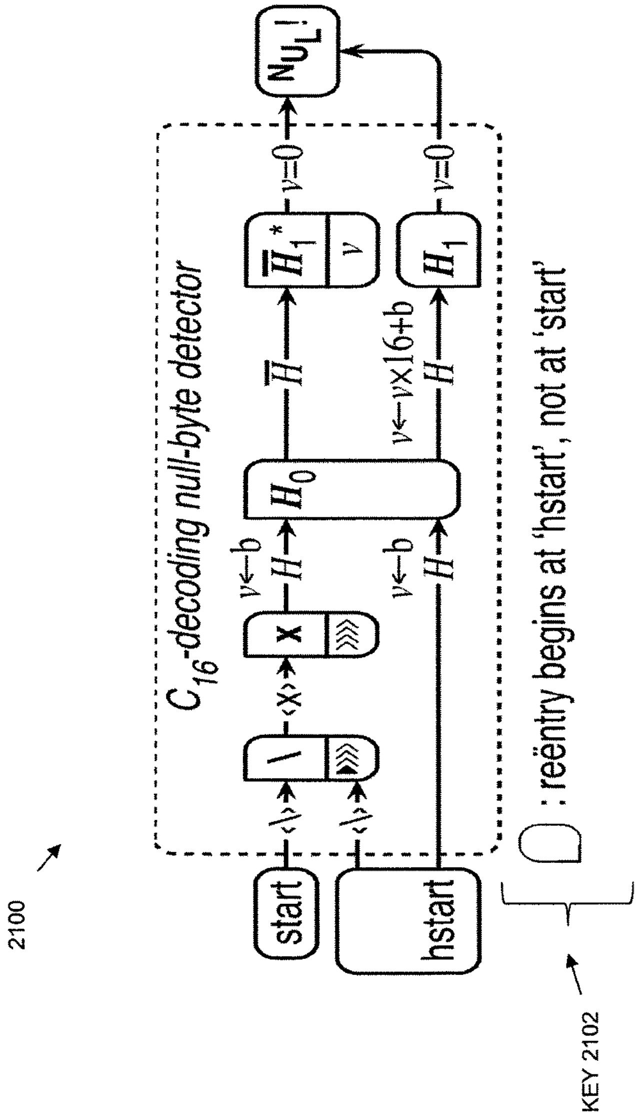
FIG. 23 shows an example of an input finite-state machine modeling computation for decoding and detecting singly encoded null-bytes encoded according to the hexadecimal C backslash-escape sequence character encoding method.

FIG. 23 shows an example of an input finite-state machine 2100 modeling computation for decoding and detecting singly encoded null-bytes encoded according to the hexadecimal C backslash-escape sequence character encoding method. A key 2102 provides a guide to the specific symbols used in the finite-state machine 2100 of FIG. 23, as well as in the other finite-state machines shown in subsequent figures. The finite-state machine 2100 is an example of one of the Input Finite-State Machines 1500 shown in FIG. 17, i.e. a finite-state machine that models computation for decoding and detecting a singly encoded null-byte that is encoded according to one of the character encoding methods in the set of character encoding methods. The computation modeled by the finite-state machine 2100 is as illustrated in FIG. 23, and will be evident to those skilled in the art from FIG. 23 further in view of the above description, including the description of the computation modeled by the finite-state machine 1600 of FIG. 18.

FIG. 24 shows an example of an input finite-state machine 2200 modeling computation for decoding and detecting singly encoded null-bytes encoded according to the UTF-16 character encoding method. The finite-state machine 2200 is an example of one of the Input Finite-State Machines 1500 shown in FIG. 17, i.e. a finite-state machine that models computation for decoding and detecting a singly encoded null-byte that is encoded according to one of the character encoding methods in the set of character encoding methods. The computation modeled by the finite-state machine 2200 is as illustrated in FIG. 24, and will be evident to those skilled in the art from FIG. 24 further in view of the above description, including the description of the computation modeled by the finite-state machine 1600 of FIG. 18.

Figure 25:
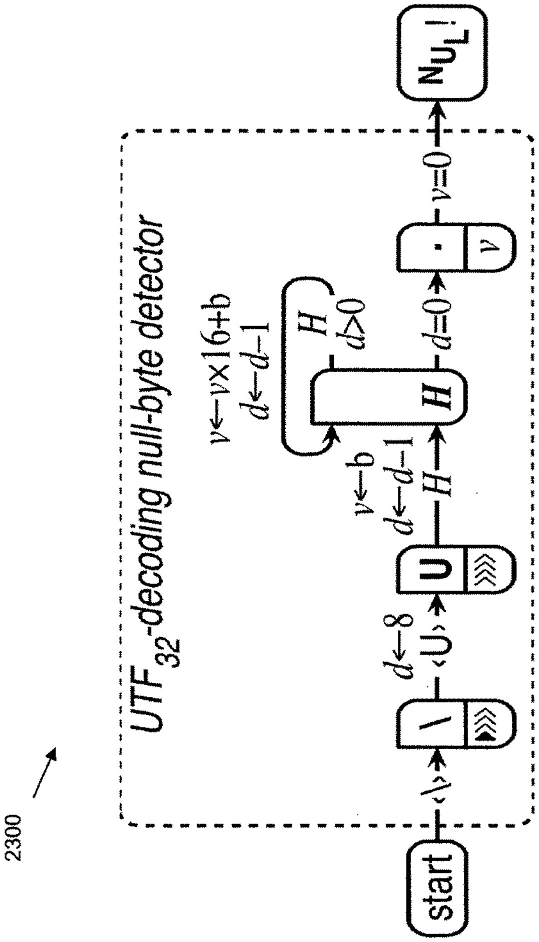
FIG. 25 shows an example of an input finite-state machine modeling computation for decoding and detecting singly encoded null-bytes encoded according to the UTF-32 character encoding method.

FIG. 25 shows an example of an input finite-state machine 2300 modeling computation for decoding and detecting singly encoded null-bytes encoded according to the UTF-32 character encoding method. The finite-state machine 2300 is an example of one of the Input Finite-State Machines 1500 shown in FIG. 17, i.e. a finite-state machine that models computation for decoding and detecting a singly encoded null-byte that is encoded according to one of the character encoding methods in the set of character encoding methods. The computation modeled by the finite-state machine 2300 is as illustrated in FIG. 25, and will be evident to those skilled in the art from FIG. 25 further in view of the above description, including the description of the computation modeled by the finite-state machine 1600 of FIG. 18.

Figure 26:
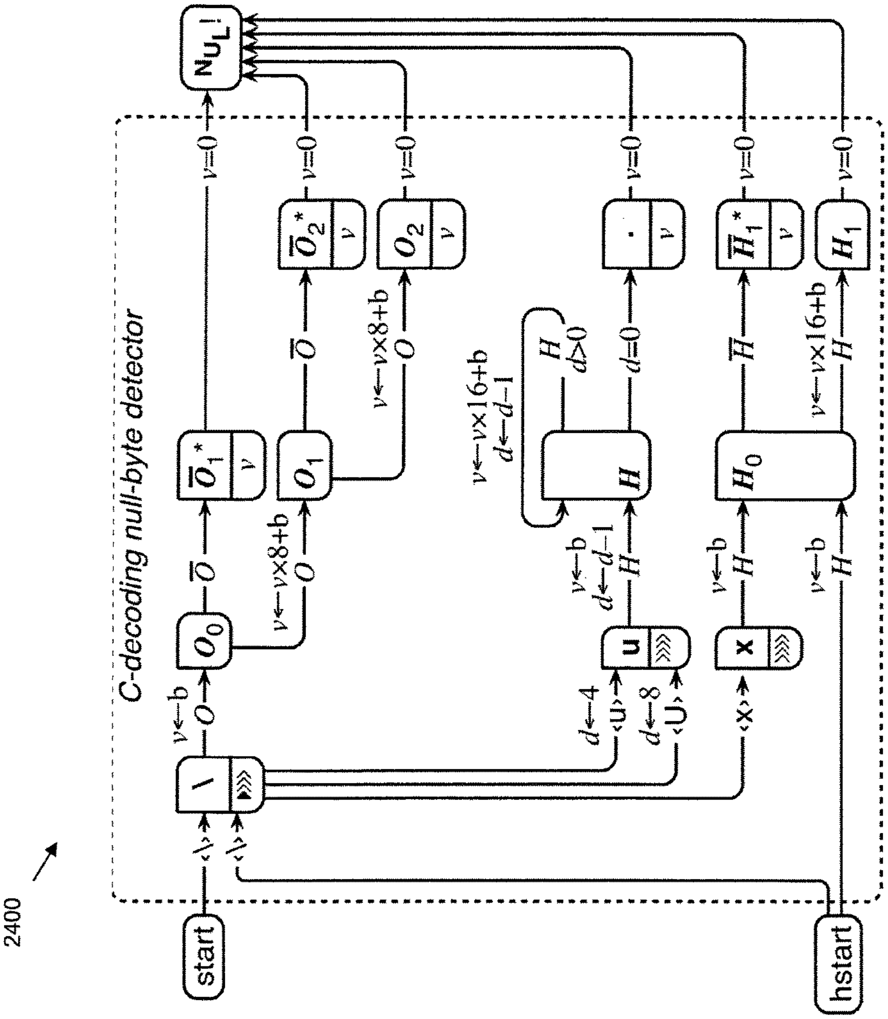
FIG. 26 shows an example of a finite-state machine modeling computation for decoding and detecting singly encoded null-bytes encoded according to either the octal C backslash-escape sequence character encoding method, the hexadecimal C backslash-escape sequence character encoding method, the UTF-16 character encoding method, or the UTF-32 character encoding method.

FIG. 26 shows an example of a finite-state machine 2400 modeling computation for decoding and detecting singly encoded null-bytes encoded according to either the octal C backslash-escape sequence character encoding method, the hexadecimal C backslash-escape sequence character encoding method, the UTF-16 character encoding method, or the UTF-32 character encoding method. The finite-state machine 2400 may be generated (e.g. in Finite-State Machine Generator 110) by combining the finite-state machine 2000 of FIG. 22, the finite-state machine 2100 of FIG. 23, the finite-state machine 2200 of FIG. 24, and the finite-state machine 2300 of FIG. 25. The computation modeled by the finite-state machine 2400 is as illustrated in FIG. 26, and will be evident to those skilled in the art from FIG. 26 further in view of the above description, including the description of the computation modeled by the finite-state machine 1600 of FIG. 18, and specifically in view of finite-state machines 2000, 2100, 2200, and 2300, shown in FIGS. 22, 23, 24 and 25, respectively.

Figure 27:
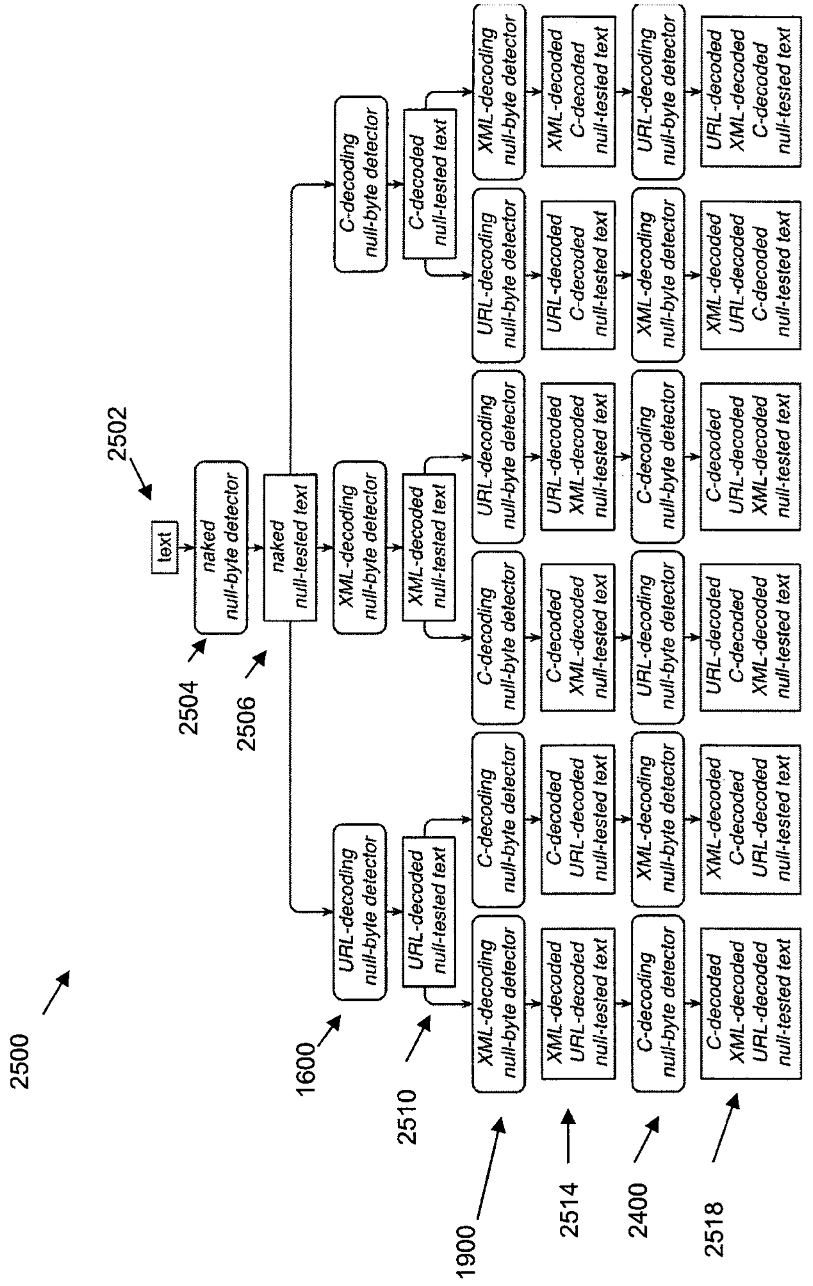
FIG. 27 shows an example of the total finite-state machine shown in FIG. 15, to decode and detect null-bytes unencoded, singly encoded, doubly encoded, and triply encoded with all permutations of the URL encoding method, the XML encoding method, and the C encoding method, without repetitions.

FIG. 27 shows an arrangement 2500 of the finite-state machines 1600, 1900, and 2400 that is a simplified example of the Total Finite-State Machine 1504 shown in FIG. 17. While in the simplified example of FIG. 27, the arrangement 2500 is of all permutations of the finite-state machines 1600, 1900 and 2400 without repetitions, and accordingly represents an example in which the set of character encoding methods consists of i) URL character encoding, ii) C backslash-escape sequence character encoding (including octal, hexadecimal, UTF-16 and UTF-32), and iii) XML character encoding (including decimal XML character encoding and hexadecimal XML character encoding), this set of character encodings is only for purposes of concise illustration and clear explanation, and those skilled in the art will recognize that other character-encoding methods (such as Puny code) may used; and that individual character-encoding methods may be made more inclusive (for example, permitting an upper-case <X> as the third character in hexadecimal XML encoding) or less inclusive (for example, excluding UTF encodings from the C-decoding null-byte detector).

In addition, while the permutations of finite-state machines 1600, 1900 and 2400 shown in the example of FIG. 27 include no repetitions, a set of permutations may alternatively be generated in which one or more repetitions of each one of the finite-state machines 1600, 1900 and 2400 are present in one or more of the individual permutations, and those skilled in the art will recognize that permutations including an arbitrary number of repetitions of the encoding methods may be accommodated by fractal repetition of the tree 2500 to the desired depth.

A single one of the permutations shown in FIG. 27 is now described. An input text 2502, in which there may be present one or more injected null-bytes, is processed according to a naked null-byte detector 2504, which checks the input text 2502 for un-encoded null-bytes. Text 2506 resulting from the checking performed by naked null-byte detector 2504 is then processed according to finite-state machine 1600, which causes any URL encoded null-bytes in text 2506 to be decoded and detected. Text 2510 resulting from the decoding performed according to finite-state machine 1600 is then processed according to finite-state machine 1900, which causes any null-bytes encoded by XML character encoding to be decoded and detected. Text 2514 resulting from the decoding performed according to finite-state machine 1900 is then processed according to finite-state machine 2400, which causes any null-bytes encoded by C backslash-escape sequence character encoding to be decoded and detected.

The descriptions of the embodiments herein include references to a number of finite-state machines. Those skilled in the art will recognize that the purposes herein the term finite-state automaton (pl. automata) may be used as a synonymous alternative to "finite-state machine".

Any or all of the directed graphs and/or finite-state machines described herein may be represented in memory (e.g. stored in memory 107 of Network Monitor 102), using any specific type of memory representation. For example, any or all of the directed graphs and/or finite-state machines described herein may be represented by or consist of a state-transition table (also known as a "state/event" table) stored in memory. Other possible memory representations of any or all of the directed graphs and/or finite-state machines described herein include, without limitation, representations including or consisting of Unified Modeling Language (UML) stored in memory, and/or representations including or consisting of Specification and Description Language (SDL) stored in memory. Alternatively, one or more of the finite-state machines described herein may be converted to microcode instructions, and loaded into firmware in an attack detection and prevention system. As another alternative, one or more of the finite-state machines described herein may be implemented directly in hardware comprising a processing unit which is loaded into the attack detection and prevention system.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(es) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method of detecting null-byte injection, comprising executing, on at least one processor, the steps of:

generating an output finite-state machine using a set of directed graphs, wherein each one of the directed graphs in the set corresponds to a singly encoded null-byte that is encoded according to a corresponding one of a set of character encoding methods, and wherein the output finite-state machine models computation for detecting at least one multiply encoded null-byte, the multiply encoded null-byte encoded according to at least one of the character encoding methods contained in the set of character encoding methods;

loading the output finite-state machine into an attack detection and prevention system;

receiving, by the attack detection and prevention system, at least one input text; and detecting, by the attack detection and prevention system in response to the output finite-state machine loaded in the attack detection and prevention system and the input text, an instance of the multiply encoded null-byte within the input text.

2. The method of claim 1, wherein each one of the directed graphs in the set of directed graphs comprises an input finite-state machine that models computation for detecting a singly encoded null-byte that is encoded according to the corresponding one of the encoding methods in the set of encoding methods.

3. The method of claim 2, wherein generating the output finite-state machine includes generating a plurality of composite finite-state machines by convolving each of the input finite-state machines by applying at least one of the encoding methods in the set of encoding methods to each of a plurality of transition characters in the input finite-state machine.

4. The method of claim 3 wherein generating the output finite-state machine further includes summing the plurality of composite finite-state machines to generate a non-deterministic finite-state machine.

5. The method of claim 4, wherein generating the output finite-state machine further includes converting the non-deterministic finite-state machine to a deterministic finite-state machine.

6. The method of claim 5, wherein generating the output finite-state machine further includes minimizing the deterministic finite-state machine to generate a minimal deterministic finite-state machine.

7. The method of claim 6, wherein loading the output finite-state machine into the attack detection and prevention system includes generating an output state-transition table representing the output finite-state machine and loading the output state-transition table into the attack detection and prevention system; and wherein detecting the instance of the multiply encoded null-byte within the input text by the attack detection and prevention system is in response to the output state-transition table loaded into the attack detection and prevention system.

8. The method of claim 7, further comprising:

generating, by the attack detection and prevention system and responsive to the output state-transition machine and the input text, a clean subset of the input text, wherein the clean subset of the input text contains no null-bytes; and passing the clean subset of the input text from the attack detection and prevention system to at least one service that is external to the attack detection and prevention system.

9. The method of claim 8, further comprising:

generating an inverted finite-state machine by inverting the output finite-state machine;

generating a plurality of multiply encoded, test null-byte encodings by, at least in part, randomly traversing the inverted output finite-state machine; and generating at least one test input text at least in part by storing the plurality of test null-byte encodings into the test input text.

10. The method of claim 1, wherein each one of the directed graphs in the set of directed graphs comprises an input finite-state machine that models computation for decoding a singly encoded null-byte that is encoded according to at least one of the encoding methods in the set of encoding methods.

11. The method of claim 10, wherein generating the output finite-state machine includes combining the input finite-state machines into a total finite-state machine that represents all permutations of the encoding methods in the set of encoding methods.

12. The method of claim 11, wherein the permutations of the encoding methods represented by the total finite-state machine include at least one repetition of one of the encoding methods in the set of encoding methods.

13. A device for protecting vulnerable services from null-byte insertion, comprising:

memory; and processing circuitry coupled to the memory, the memory storing program code which, when executed by the processing circuitry, causes the processing circuitry to:

generate, in the memory, an output finite-state machine, using a set of directed graphs stored in the memory, wherein each one of the directed graphs in the set corresponds to a singly encoded null-byte that is encoded according to a corresponding one of a set of character encoding methods, and wherein the output finite-state machine models computation for detecting at least one multiply encoded null-byte, the multiply encoded null-byte encoded according to at least one of the character encoding methods contained in the set of character encoding methods;

load the output finite-state machine into an attack detection and prevention system in the program code stored in the memory; and detect, in response to the output finite-state machine loaded in the attack detection and prevention system and an input text, an instance of the multiply encoded null-byte within the input text.

14. The device of claim 13, wherein each one of the directed graphs in the set of directed graphs comprises an input finite-state machine that models computation for detecting a singly encoded null-byte that is encoded according to the corresponding one of the encoding methods in the set of encoding methods.

15. The device of claim 14, wherein the processing circuitry generates the output finite-state machine at least in part by generating a plurality of composite finite-state machines by convolving each of the input finite-state machines by applying at least one of the encoding methods in the set of encoding methods to each of a plurality of transition characters in the input finite-state machine.

16. The device of claim 15 wherein the processing circuitry generates the output finite-state machine at least in part by summing the plurality of composite finite-state machines to generate a non-deterministic finite-state machine.

17. The device of claim 16, wherein the processing circuitry generates the output finite-state machine further at least in part by converting the non-deterministic finite-state machine to a deterministic finite-state machine.

18. The device of claim 17, wherein the processing circuitry generates the output finite-state machine at least in part by minimizing the deterministic finite-state machine to generate a minimal deterministic finite-state machine.

19. The device of claim 18, wherein the processing circuitry loads the output finite-state machine into the attack detection and prevention system at least in part by generating an output state-transition table representing the output finite-state machine and loading the output state-transition table into the attack detection and prevention system; and wherein the processing circuitry detects the instance of the multiply encoded null-byte within the input text by the attack detection and prevention system in response to the output state-transition table loaded into the attack detection and prevention system.

20. A computer program product having a non-transitory computer readable medium which stores a set of instructions operable to protect vulnerable services from null-byte insertion, the set of instructions, when carried out by processing circuitry, causing the processing circuitry to:

generate, using a set of directed graphs, wherein each one of the directed graphs in the set corresponds to a singly encoded null-byte that is encoded according to a corresponding one of a set of character encoding methods, an output finite-state machine, wherein the output finite-state machine models computation for detecting at least one multiply encoded null-byte, the multiply encoded null-byte encoded according to at least one of the character encoding methods contained in the set of character encoding methods;

load the output finite-state machine into an attack detection and prevention system; and detect, in response to the output finite-state machine loaded in the attack detection and prevention system and an input text, an instance of the multiply encoded null-byte within the input text.

21. The method of claim 1 wherein the set of character encoding methods includes i) octal C backslash-escape sequence encoding, ii) hexadecimal C backslash-escape sequence encoding, iii) UTF-16 C backslash-escape sequence encoding (UTF-16), iv) UTF-32 C backslash-escape sequence encoding (UTF-32), v) URL encoding, vi) decimal XML encoding, and vii) hexadecimal XML encoding; and wherein the multiply encoded null-byte is encoded according to at least two different character encoding methods in the set of character encoding methods.

22. The method of claim 21 wherein the multiply encoded null-byte is encoded according to both URL encoding and XML encoding; and wherein detecting, by the attack detection and prevention system in response to the output finite-state machine loaded in the attack detection and prevention system and the input text, an instance of the multiply encoded null-byte within the input text comprises detecting an instance of a null-byte encoded according to both URL encoding and XML encoding within the input text.

* * * * *